Aug. 11, 1936.  S. L. KERR  2,050,338
AUTOMATIC OPERATOR
Filed Nov. 20, 1929  8 Sheets-Sheet 1

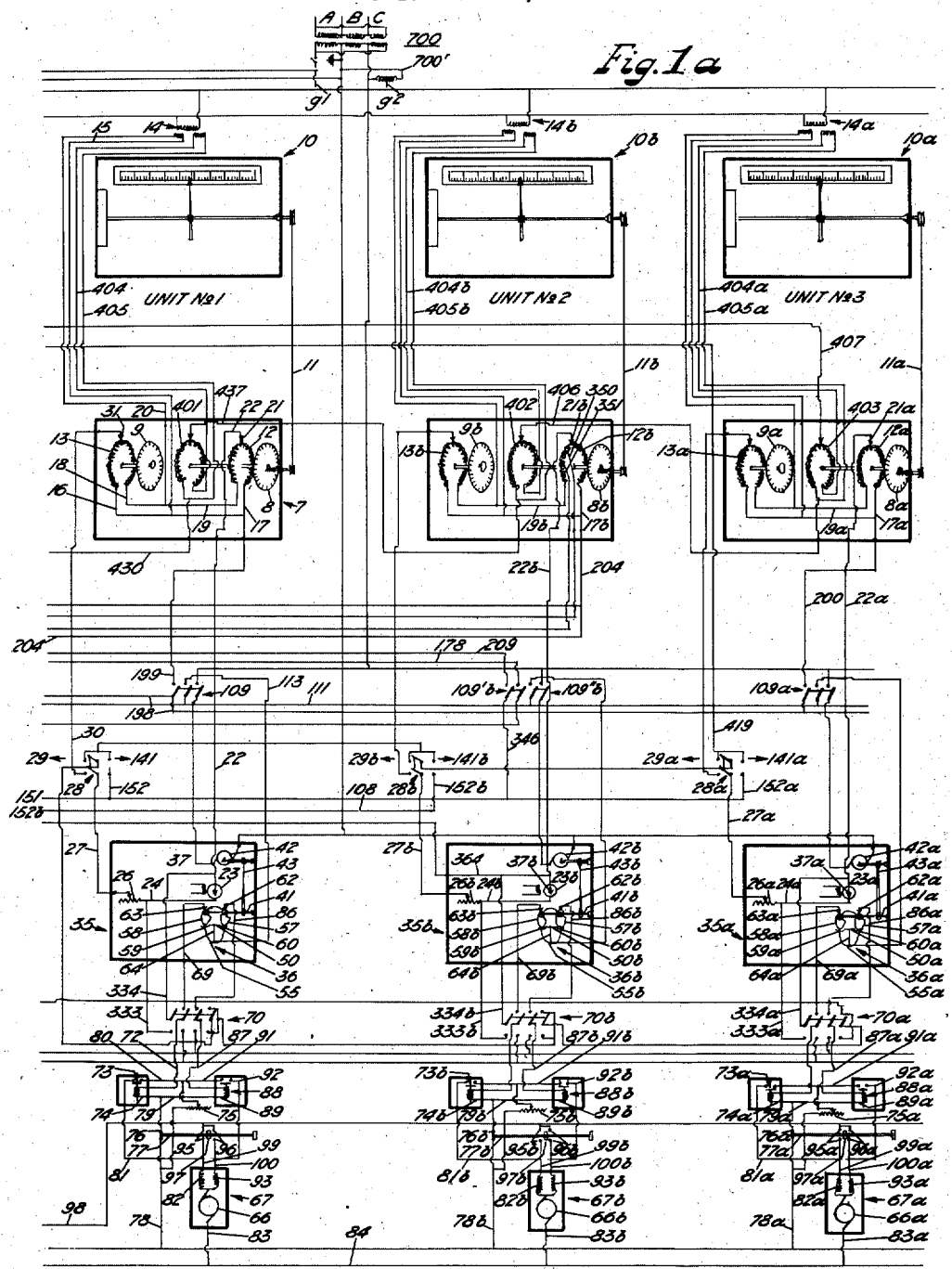

Aug. 11, 1936. S. L. KERR 2,050,338
AUTOMATIC OPERATOR
Filed Nov. 20, 1929 8 Sheets-Sheet 3

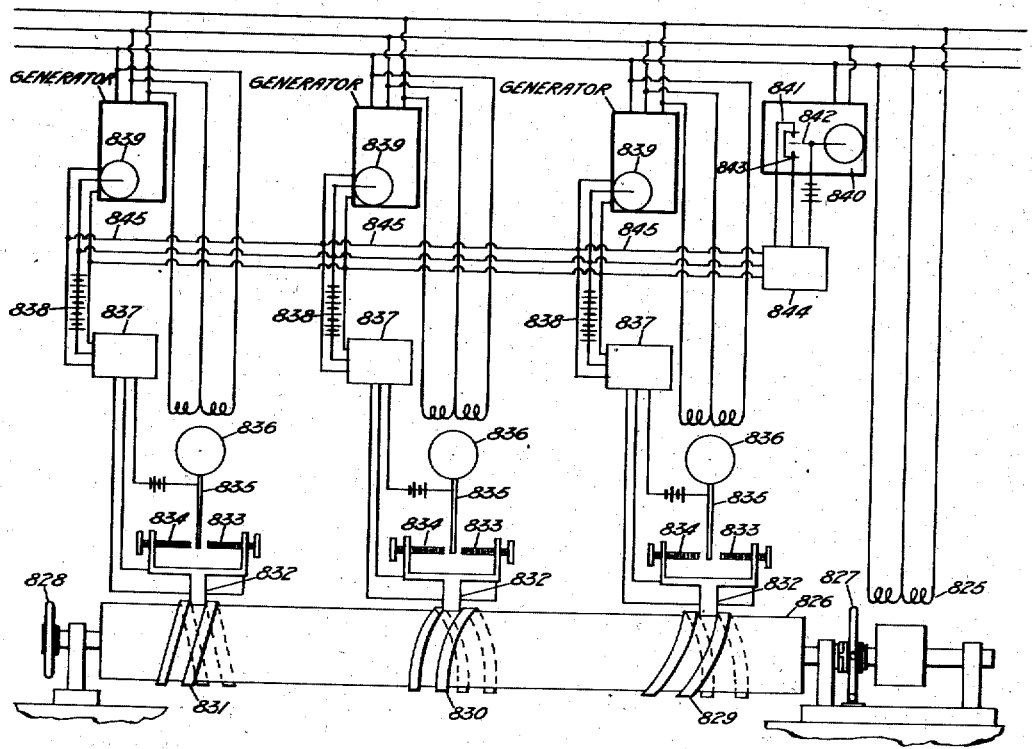
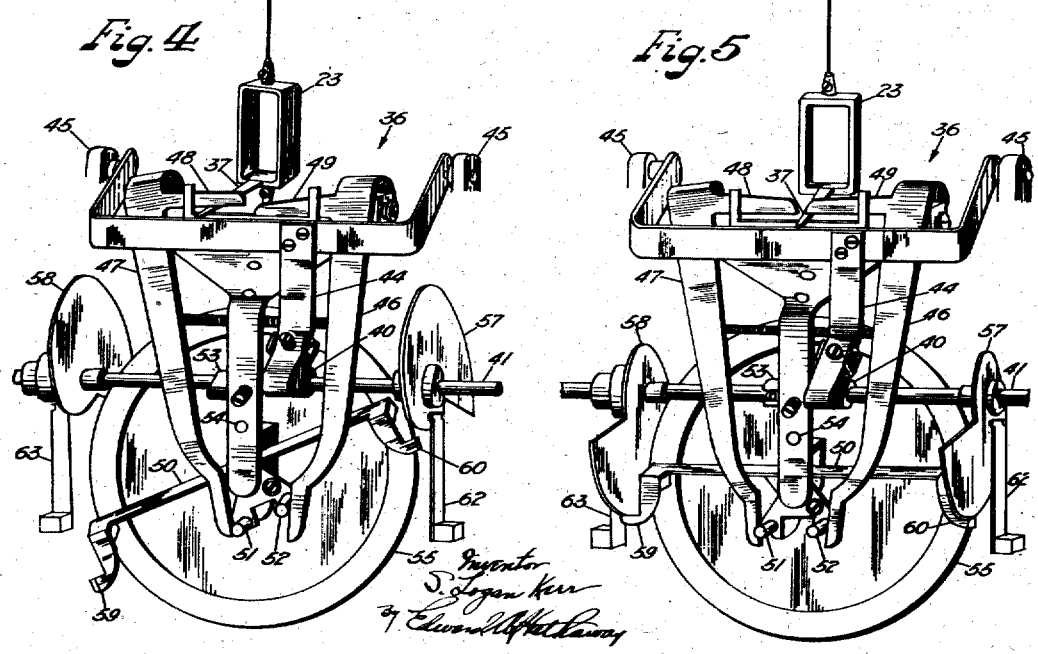

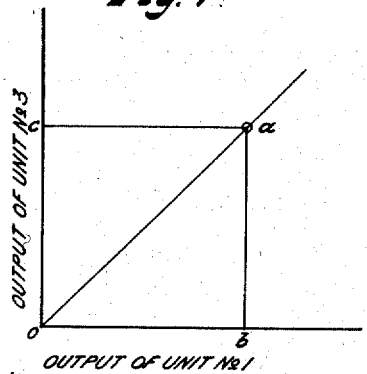
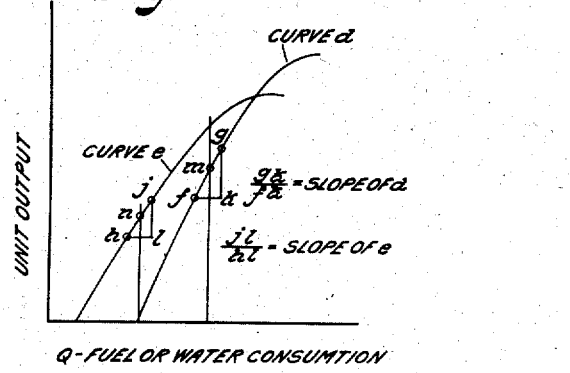
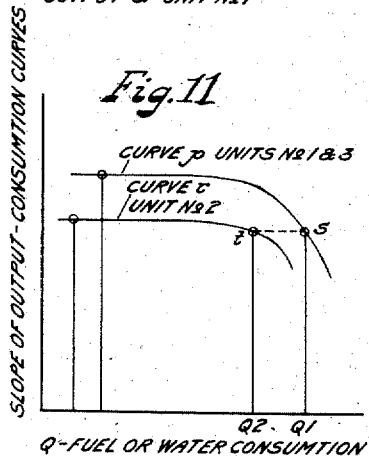
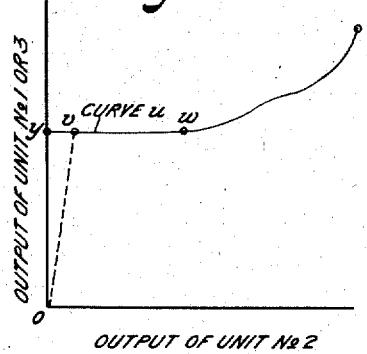

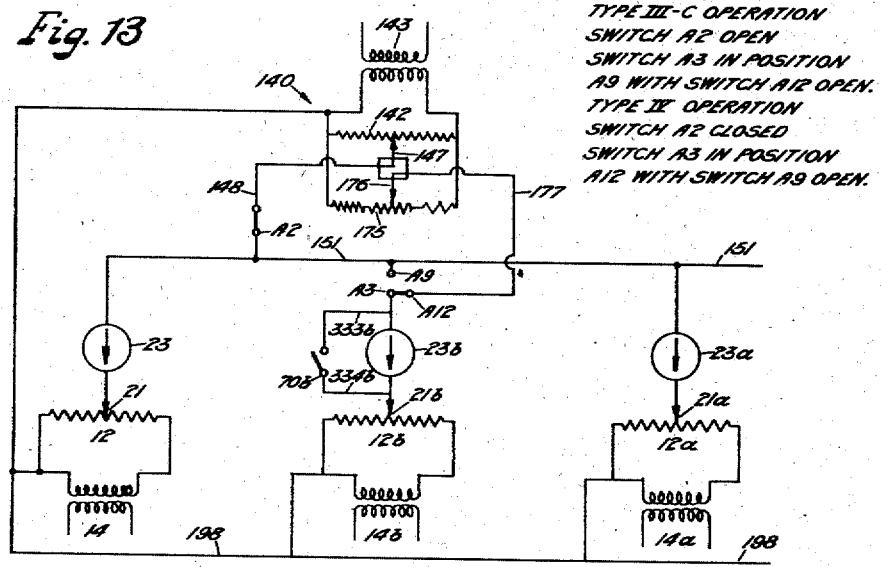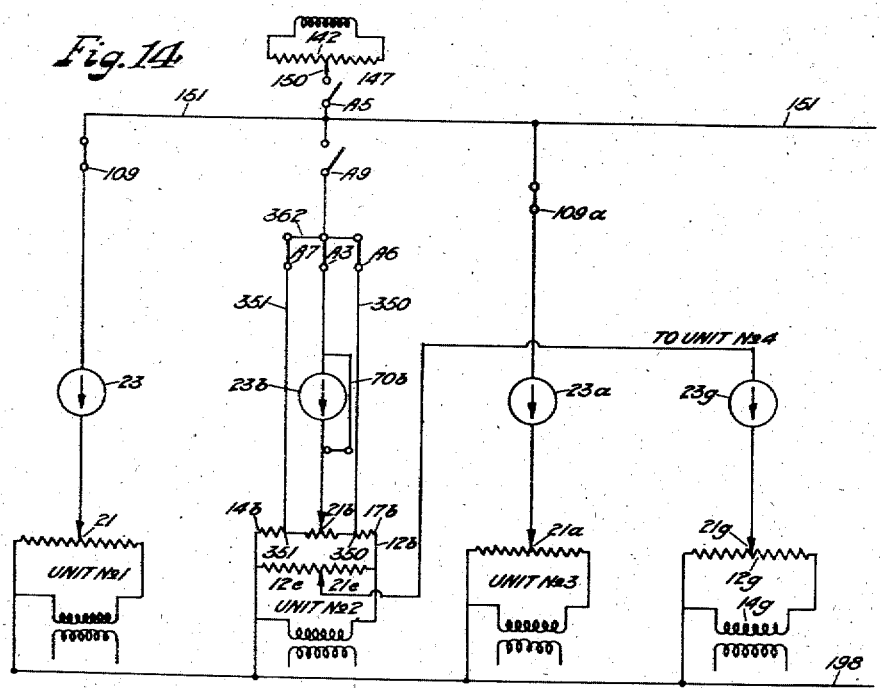

Aug. 11, 1936.    S. L. KERR    2,050,338
AUTOMATIC OPERATOR
Filed Nov. 20, 1929    8 Sheets-Sheet 7
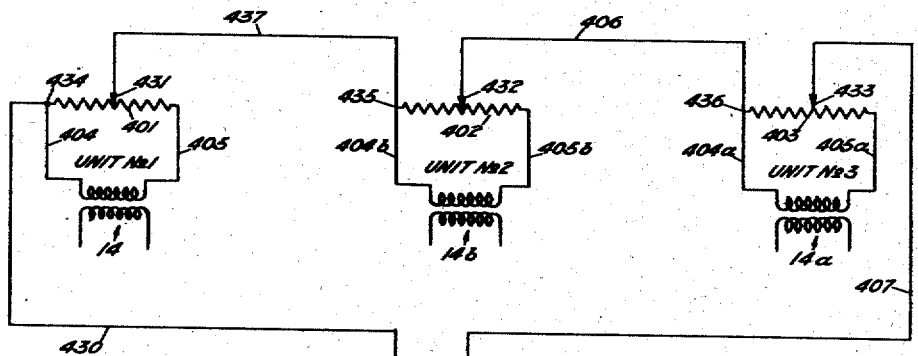
*Fig.15*
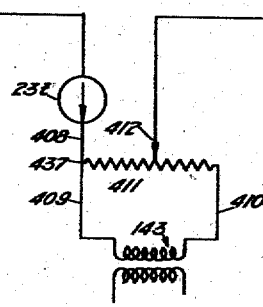
*Fig.16*
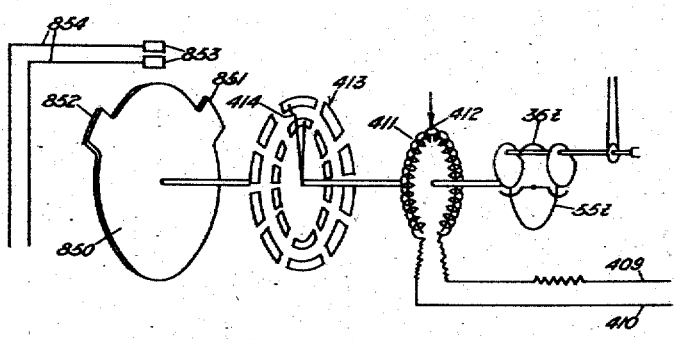
INVENTOR
S. Logan Kerr
BY
Edward
ATTORNEY Aug. 11, 1936.    S. L. KERR    2,050,338
AUTOMATIC OPERATOR
Filed Nov. 20, 1929    8 Sheets-Sheet 8

INVENTOR
S. Logan Kerr
BY
Edward A. Hathaway
ATTORNEY

Patented Aug. 11, 1936

2,050,338

UNITED STATES PATENT OFFICE 2,050,338

AUTOMATIC OPERATOR

Samuel Logan Kerr, Philadelphia, Pa.

Application November 29, 1929, Serial No. 408,544

56 Claims. (Cl. 290—4)

This invention relates to a method and apparatus or system for controlling electrical generating plants and more particularly for controlling the plant output, the speed or frequency of the system, and the economic distribution of output between the various units in the generating stations. My invention while applicable to any form of prime mover or combination of prime movers is described herein, for purposes of illustration, in connection with a hydro-electric generating station.

The processes involved in the operation of such a station have heretofore been accomplished primarily by manual means using one or more operators on constant duty. The operator's function is to start and stop units, place them in parallel with the generating system and adjust the total output to meet the demands of the power users or to correct the system speed or frequency to normal, and also to adjust the load between units to secure the most economic distribution of loads or to adjust the output of the station in combination with other stations to secure the most economic combination.

The variations in requirements for each of these functions, particularly those dealing with a change in demand or a change in speed, occur rapidly and at frequent intervals thus necessitating constant manual attention of the personnel to maintain a commercial standard of operation. However, to secure a higher standard of operation requires closer attention on the part of the operating personnel than is reasonable to demand from them, or than is practically possible to secure.

For a better understanding of my invention a brief description will be given of the usual duties of the operators in such a station. In this example which may be modified to apply to any number of specific installations, it is assumed that there are several units in the station, for example, three, and that this station supplies power directly to the various power users and that no additional generating units are in parallel with this system.

With several units in service delivering power to the distributing system described above, the station output will be fixed by the demands of the various power users, and the individual unit governors will act to correct appreciable changes in speed caused by the differences between the supply and demand. With the regular characteristics of alternating current generating units a drooping characteristic of speed with respect to output is necessary for the purposes of obtaining stability with the usual type of speed governor. Thus if the plant is operating at normal speed, and the demand increases, the final speed attained with a stable condition would be a somewhat small percentage below normal. The operators function then is to increase the load on the generating units by adjusting the remote control switches on the load adjusting motors of the unit speed governor in such a manner as to increase the output a sufficient amount to bring the speed back to normal and thus maintain the normal speed of the system at a constant value. After the speed has thus been adjusted to normal if the demand should then decrease the speed will go above normal. In this case the operator would manipulate the switches on the load adjusting motors of the governors so as to decrease the output slightly and thereby return the speed to normal. The general functions described above may be termed the correction of frequency to normal by manual means.

In the case where more than one unit is in service the operation becomes more complicated since if the operator adjusts the load on only one unit the other units will change their load automatically due to being returned to their normal speed through the parallel or synchronized connection with the adjusted unit. However, the load distribution between units obtained in this manner will not necessarily be in accordance with the requirements for the best operating efficiency. It is a well established fact that there is a certain definite schedule for the loading of the various units to secure the best combined economy. The function of the operator in addition to correcting the speed to normal is also to redistribute loads between the various units in the plant in accordance with the predetermined schedule for economy. Since each unit may have different characteristics from the other units in the station the schedule may call for unequal distribution of load between units. In the case where all the units are alike in a station, the schedule may call for them to divide the load equally under all conditions or an unequal distribution of load may be effected within certain ranges to secure the best results.

In any case a fixed schedule must be maintained to secure the maximum efficiency of the combination. The operator therefore is under the necessity of adjusting the load on all units so that in correcting the normal speed of the system the schedule for load is likewise maintained. In order to effect this, it is necessary for him to manipulate the switches on the load adjusting motors of the various units in the usual manner, namely to raise or lower the station output to correct the frequency and then to readjust the load between units to maintain the schedule for economic loading and at the same time not disturb the system frequency from normal.

As the variations in demand increase the requirement on the part of the operator to maintain constant speed is still further increased and for most all plants the continuous attention of the operator is required in order to even approach the fulfillment of constant frequency and economic load distribution between units.

In the case where the generating system would consist of more than one plant the same general procedure would be followed, except that each plant would be assisting in the correction of system speed while the combined load schedule for the distribution of output between plants could be maintained in the same way as the schedule for load distribution between units with the same object in view, namely, that of securing the most efficient operation of the combination. In the case of several plants there is of course the individual loading schedule for the various units in each plant in addition to the schedule for the station as a whole with respect to the other plants on the system.

The case where the units in a given plant do not have the same characteristic of efficiency with respect to output becomes more complicated since it requires unequal distribution of load between units. A definite schedule can be worked out based on the individual unit characteristics so that for any output of the plant the distribution of load between the various units will be for maximum economy. In such a case where, for example, two units in a plant should take one half of the variation in demand and the third unit should take one half, then each of the first two units should increase one half as much as the third unit and this in turn requires still closer attention on the part of the operator to effect the accurate distribution of load between units.

One object of my invention is to perform the above and other functions automatically and hence maintain a closer control upon these functions than it is possible to secure in manual operation.

In my invention the functions of the operator are performed by automatic equipment which will maintain the economic distribution of load between the various units or combination of units in any plant or group of plants, simultaneously with the correction of the frequency to normal following variations in demand or will maintain a fixed output on a given station simultaneously with the economic distribution of load between the units in service. One object of my control equipment is to reduce the losses resulting from incorrect load distribution to a minimum, and hence increase the efficiency of operation of any plant or group of plants by maintaining the ideal schedules for loading distribution or for other operating functions of the station.

These functions are accomplished automatically in my invention by the provision of a combination of instruments and circuits which indicate the output of each unit or the gate opening of each individual unit, or some function of the unit which is proportional to the output or the discharge. If the relation of the outputs or these other functions is established from the unit characteristics then the control equipment is applied in such a manner that it will be sensitive to a variation from the ideal schedule which in turn will cause contacts to be closed to operate the load adjusting devices of the prime mover in such a manner as to correct for the difference existing.

In a group of units it is possible to determine the correct relation of output with respect to each other and the combination of elements in my control equipment is such that it will maintain this relation through the actuation of the load adjusting devices on the prime mover. To effect in addition a correction for frequency, some form of frequency sensitive apparatus is employed which will operate contacts when the frequency varies above or below the desired value. By making these contacts, electrical control impulses cause the load adjusting devices on the individual unit governors to be moved to increase or decrease the output in accordance with the departure of the frequency from normal. These control impulses may be arranged to effect the output of one or more units while intermediate or simultaneous contact may be provided for the load distributing functions of the control. In cases where the station output is to be maintained constant some form of indication of the total station output or some other variable which is in a known relation to the station output may be used as a base for the control. Some instrument sensitive to this variable is used in my combination to actuate contacts if the station output departs from the desired amount. These contacts act to change the setting of the load adjusting mechanism on the governor in such a manner as to restore the station output to the desired amount. Simultaneous or in coordination with these impulses are the secondary impulses for load distribution between units, and thus the station output is maintained at a constant value and the individual unit loadings are maintained at their desired schedule for maximum efficiency.

This same general plan is used in connection with the supplying of a fixed amount of power to any given customer of the power company by connecting, for example, a watt-meter in the supply line to the particular customer and having the contacts arranged so that they act to increase or decrease the station load in such a manner that the supply of power to the customer is maintained constant. Thus if the supply should increase beyond the desired amount, the control contacts act to reduce the output on the units through the load adjusting devices, or vice versa if the supply to the customer falls below the desired amount. In this manner the automatic equipment performs the functions of the ideal operator in being constantly alert to variations in frequency in output along with other functions which it is desired to control.

In one specific embodiment of the invention as applied to a hydro-electric station of say three units, two units of which are alike and one unit different from these two, the arrangement of the control equipment is as follows: Each unit is equipped with a watt-meter having a shaft which moves in direct proportion to the unit output and which is used to drive a disk having what is called a load transmitting variable resistance placed around its circumference. Another variable resistance called a load setting resistance is a duplicate of the first, but is manually adjustable. These two resistances are connected electrically in parallel and a constant potential maintained on their terminals. Bridged across these resistances is a galvanometer circuit connected with each resistance through suitable contacts which permit each resistance to be moved relative to its respective contact. Thus with the manually adjustable resistance set in any given position there will be a corresponding position on the other resistance at which the potential will be the same on each resistance contact of the bridged galvanometer circuit and hence the galvanometer will be in neutral position. As the output of the unit varies, the watt-meter operated resistance is rotated past its contact point in such a manner that the potential existing between one end of this resistance and its contacts will vary as some proportion of the unit output.

Thus it may be seen that with a manually set potential on one side of the bridge, the other side of the bridge having its potential varied in proportion to the unit output, a balanced condition will exist when these two potentials are equal or in other words when the output of the unit corresponds to the manually adjusted potential. Proper scales are employed which are calibrated in terms of the unit output so that the manually operated dial is set to a given output and the bridge circuit will be balanced when the watt-meter driven potential is equal to this value and hence the unit output equals the manually set amount. The variable contact-making device is controlled by the galvanometer so that, upon a load variation, an electrical circuit connected to the load adjusting motor is intermittently closed whereby the load adjusting motor is energized by impulses. These control impulses cause the load adjusting device on the governor to increase or decrease the unit output in accordance with the potential controlled by the watt-meter.

The above case takes care of the maintaining of a fixed load on any one unit. When a combination of units are employed, for example units having the same characteristic, the manually adjustable resistance described above can be connected to both units, through an individual contact-making galvanometer and control circuit on each unit, in such a manner that both units will carry a load corresponding to the setting on a single master load setting dial. In the case where a unit having dissimilar characteristics is operated in combination with these two similar units then two sets of manually adjustable resistances are employed one of which is connected to the units having similar characteristics and one of which is arranged in combination with the controls of the dissimilar unit. This arrangement is constructed in such a manner that two contact points, one for each resistance, have potentials in proportion to the desired fixed output of the respective units, this proportion being in accordance with the ideal loading schedule. Each contact is connected to the bridge circuits of the proper individual units so as to adjust the loads on the units in the proper proportion. In this manner proper schedule of the load on each unit is maintained since the two potentials on the manually set resistance are in proportion to this desired output on each unit, and the individual unit galvanometer will not be balanced until the individual unit watt-meters transmit a potential equal to that on the manually set resistance and hence each unit has a correct amount of output.

In a case where the station is to control frequency some sort of frequency sensitive device is employed as in combination with a contact-making device which will make contacts when the frequency departs from normal. These contacts in turn are connected to the same relays which are used in connection with the fixed local control just mentioned but arrangements are made so that the control impulses from the frequency sensitive device will be transmitted to one unit and the variation in output on this unit determines the output of the remaining units by the amount of potential transmitted from the watt-meter driven resistance against the potential of the watt-meter driven resistances of the other units. In this way the individual unit galvanometer on units other than the unit receiving the impulses for frequency control will be deflected if the output on these individual units differs from the potential which is transmitted from the frequency control. Hence the distribution of load between the units is a function of the variable potential which is transmitted as a function of the output of the frequency controlling unit. By the proper displacement of resistance around this disc, driven from the watt-meter, it is possible to transmit any desired potential either as a direct or variable function of the output of the frequency controlling unit in such a manner that the other unit bridge circuits will be balanced at some variable output of the individual units with respect to the frequency controlling unit and thus maintaining the economy schedule of load even though the whole station output is varied due to the requirements for frequency correction. Frequency control impulses can also be given to all units simultaneously and the watt-meter resistances, on each individual unit arranged with the unit bridge circuits so that intermediate equalizing impulses are given to the units in such a manner that the schedule for economic load is maintained.

Other objects and advantages of my improved arrangement will be seen from the following description of the accompanying drawings in which:

Figs. 1 and 1a together comprise a detailed disclosure of the instruments and their wiring connections, although for simplicity and clarity the frequency selector switch is shown as a plurality of independent knife switches.

Fig. 2 is a fragmentary detail showing a battery or other source of current in place of certain other transformers, Fig. 3 is an isolated and simplified wiring diagram of the galvanometer circuit bridged across the parallel connected unit load setting and transmitting resistances, Fig. 4 is a diagrammatic perspective of the contact making device in position for making a series of successive contacts, Fig. 5 is a perspective of a contact making device in position whereby no contacts will be made, Fig. 6 is an elevation of one form of interrupter.

Figure 17:
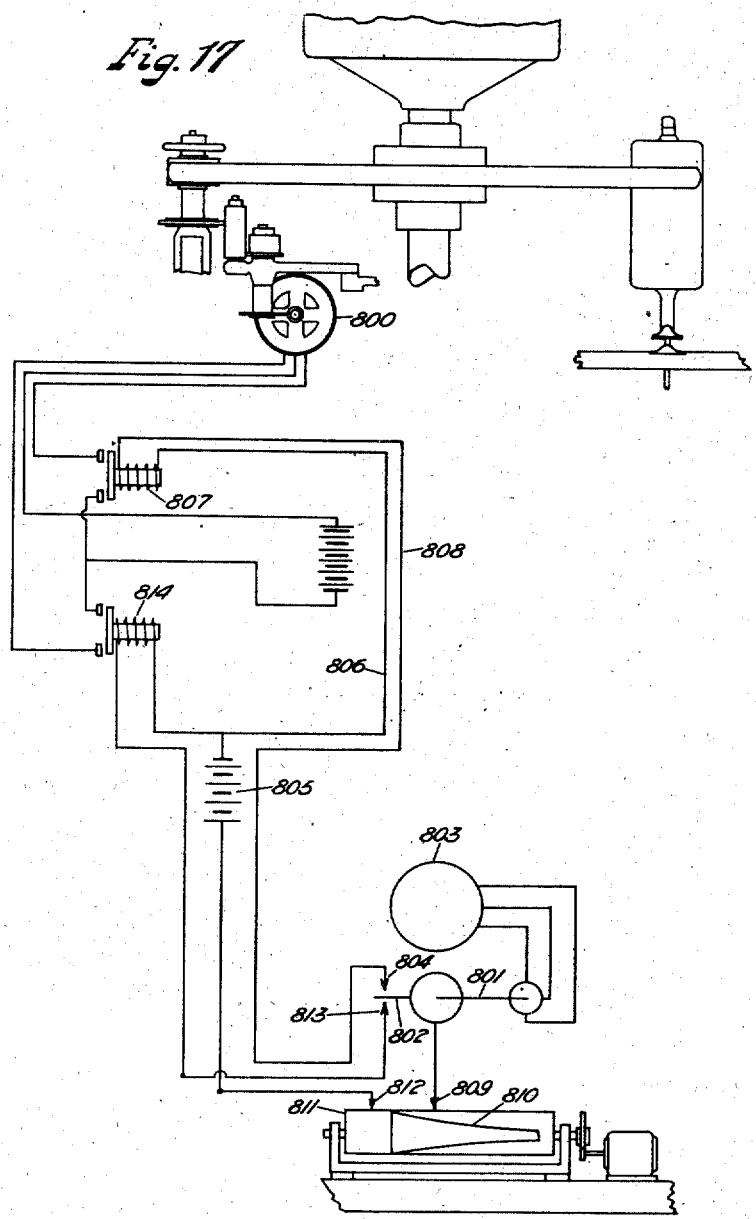

Figs. 9 to 12 are curves illustrating the manner in which a schedule of operation for maximum combined efficiency may be determined for units of either similar or dissimilar characteristics, Figs. 13, 14 and 15 are isolated and simplified diagrams by which certain functions are obtained by my improved equipment, Fig. 16 is an enlarged view of one portion of the totalizing watt-meter and load limit equipment with a further element attached thereto for automatically cutting other units in or out when the units already in operation reach a certain predetermined output, or for signaling when such output is reached, Fig. 17 is a modification of the load control for a single unit which may also be used for frequency control, and Fig. 18 is a further modification showing mechanical means for distributing the load in accordance with the unit characteristics.

In considering the specific application of my invention to hydraulic plants it will of course be understood that the usual hydraulic equipment remains unchanged. The speed governor at all times functions in its normal manner to control fluid distribution to the gate operating servo motors thereby to control the power of the turbine in the accepted manner. Usual restoring mechanism may be employed between the speed governor and turbine gates while any of the other control devices such as overspeed governors, safety appliances or the like may also be used.

If the prime mover is of the steam turbine or internal combustion engine type the type of governor and power control valve mechanism usually employed therewith may be used and these will operate in their usual manner with the functions of my improved arrangement simply superimposed on the functions thereof as in the case of the hydraulic governor.

*Unit load setter and transmitter: wattmeter: constant load on single unit.*—A watt-meter 10, Fig. 1a is connected in any usual manner to indicate the output of its unit No. 1. This watt-meter may be of any suitable type although, for purposes of illustration, there is shown diagrammatically a usual type having its indicating pointer movable along a rotatable screw-threaded shaft which is arranged to drive mechanically, through suitable means such as a belt or chain 11, a load transmitting variable resistance 12 of a unit load transmitter and setter generally indicated at 7. This device operates only in accordance with the load on its particular power unit.

The resistance 12 is diagrammatically shown as being rotatably actuated through a worm and worm gear although the actual device may employ various of mechanical arrangements depending somewhat upon the type of watt-meter and resistance used.

Figure 2:
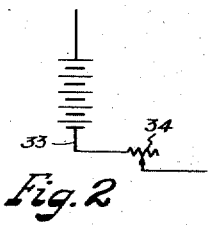

The load transmitting resistance is connected electrically in parallel with a load setting resistance 13 which is manually adjustable by a suitable handwheel. A potential, maintained across two ends of the parallel connection, is transmitted from a standard potential transformer 14, which is energized by current from main buses, through wire 15, terminal wires 16, 17, resistances 12 and 13, terminal wires 18, 19 and back to transformer 14 through wire 20. A battery circuit 33, Fig. 2, having an adjustable resistance 34 may, if desired, be used for the source of potential instead of transformer 14 and the corresponding transformers for the other units.

Figure 3:
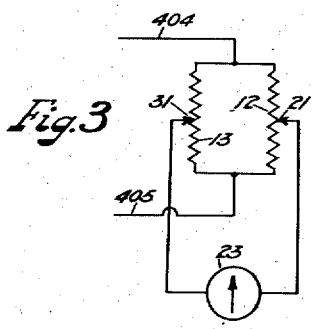

Bridged across the resistances, is a galvanometer circuit comprising a terminal 21, wire 22, galvanometer 23, wire 24, manually adjustable resistance 26, wire 27, switch 28 set in position 29, wire 30 and terminal 31 of resistance 13. The parallel resistance and bridge galvanometer circuits are shown diagrammatically in the isolated view Fig. 3.

It will be seen that for a given position of contact 31 on unit load setting resistance 13 there is a corresponding position for contact 21 on resistance 12 at which no potential difference will exist between contacts 21 and 31 and therefore no current flow in the galvanometer circuit. Also, the direction of current flow through this circuit depends upon which direction resistance 12 moves from said corresponding point. This movement is effected by changes in load as indicated by the watt-meter and hence an increase or decrease in load on the unit will cause current to flow in one or the other of opposite directions through the galvanometer circuit. This feature is used to determine any fixed load at which it is desired to maintain the unit. Load variations, either up or down, from this fixed value will be only temporary as the mechanism responsive to the direction of current flow in the galvanometer will act to correct these variations and bring the load back to the given desired value as fixed by the position of point 31 with respect to resistance 13.

*Load controller (galvanometer controlled contact-making device).*—In the controller generally indicated at 35 and to be described now, I use a well-known instrument in a novel manner so as to perform certain new functions with my combination. This mechanism comprises a contact-making device generally indicated at 36, see Figs. 4 and 5, arranged so that when the galvanometer circuit has no current flowing therethrough the zero or balanced position of the galvanometer pointer 37 lies directly under a gap between adjacent ends of levers 38 and 39, Fig. 5. A cam 40 on a cam-shaft 41, continuously driven by a motor 42, Fig. 1a, through any suitable means diagrammatically shown as a belt and pulley 43, raises a rocker arm 44, Fig. 4 pivoted at 45. This rocker arm in lifting picks up the galvanometer pointer which overhangs the rocker arm, and raises it into the gap, Fig. 5 between levers 46 and 47. However, if the pointer deflects due to current in the galvanometer, Fig. 4, then when rocker arm 44 picks up the galvanometer pointer it also lifts the short leg 38 or 39 of one or the other of levers 46 or 47.

As the arm such as 47 swings, its lower end moves a pivoted cross arm 50, through a pin 51 which is mounted on a bracket carried by the arm 50. Another pin 52 cooperates with arm 46 when the galvanometer pointer is swung in the other direction by current flowing in the opposite direction in the galvanometer circuit.

When rocker arm 44 rises, a cam 53 simultaneously moves arm 54, and its pivotally carried cross arm 50, outwardly away from disk 55. On the next half revolution of cam shaft 41, cam 53 permits arm 54 to move back toward disk 55, likewise carrying cross arm 50 which in its tilted position frictionally engages disk 55. By the time this frictional engagement is effected, shaft 41 has rotated cams 57 and 58 so that one or the other engages fingers 59 or 60 to move cross arm 50 back to its horizontal position. Cams 53 and 40 rotate together so that rocker arm 44 releases its hold on galvanometer pointer 37 after the frictional contact has been made, thereafter permitting arm 47 to be returned to its neutral position by pin 51 attached to cross arm 50 when the cross arm is being returned to its horizontal position by cam 57. The above cycle of operations is repeated if, on the next revolution of the continuously rotating cam shaft 41, current is still flowing to the galvanometer circuit so as to deflect the pointer. If the galvanometer current flows in the opposite direction cross arm 50 is oppositely deflected by the short leg 39 of lever 46 through pin 52. Cross arm 50 is then returned to its horizontal position by cam 58 contacting finger 59. From the above it is seen that depending upon the direction of current flow in the galvanometer circuit one or the other of cams and fingers 57, 60 or 58, 59 will have intermittent contact with each other until the galvanometer current is reduced to zero. Also, as the galvanometer pointer gradually moves toward its neutral point, due to diminishing current, the length of time of contact between either cam and its cooperating finger becomes correspondingly shorter. This is because the amount that arm 50 is rotated depends upon the magnitude of the galvanometer deflection for as the deflection decreases the pointer moves away from the fulcrum of the levers 46 and 47 and toward the gap between the short legs 49.

In my invention, I utilize this intermittent contacting by providing stationary brushes 62 and 63 slidably engaging and having electrical contact with cams 57 and 58 which are suitably insulated from, but fixed to, cam shaft 41 while a common or neutral contact 64 is diagrammatically shown engaging the disk and through the contact of cross arm 50 with the disk completes the circuit between 63 and 64 by means of cams 58 and 59 or between contacts 62 and 64 by means of cam 57 and finger 60.

*Load adjusting motor operated by load control circuits.*—The load adjusting motor of the speed governor controlled by the above mechanism is as follows: With a desired value of load as set by dial 9 indicating the position of resistance 13, if watt-meter 10 responds to a change in load, then load transmitting variable resistance 12 is rotated and a potential difference in the galvanometer circuit results between points 21 and 31 as described, thereby deflecting the galvanometer pointer 37, Fig. 1a. Contacts 59 or 60 are thereupon closed depending upon whether the load variation is an increase or decrease with respect to the desired fixed value set by dial 9.

In making these contacts the load adjusting motor 66 on the unit governor, diagrammatically represented at 67, is rotated in the proper direction for increasing or decreasing the load on the unit depending upon which of contacts 59 or 60 is closed by the galvanometer. The mechanism controlled by this motor for adjusting the turbine gates or control valve is well known and need not be described here.

In order to make or break currents of sufficient size to actuate the load adjusting motor 66, it is necessary to use relays of high resistance actuated by the resulting small current which is preferably used on the contact-making device 36. This current is supplied through a common wire 64, Fig. 1a, from a source which will be later described. When finger 59 and cam 58 make contact, current flows from common wire 64, through brush contact 63, wire 69, switch 70 set in up position, wire 72, actuating coil on relay 73, wire 74, contacts 76 of manually operable switch 77 and wire 78 to the other side of the source of said current supply to be described later, thereby energizing and closing relay 73. Current then passes from wire 78 connected to the source, through adjustable resistance 75, wire 79, 80 and 81 to energize lowering field 82 of the split field load adjusting motor 66, and to the opposite side of a direct current supply 85, preferably of 125 volts, as by wires 83 and 84.

If contact 60 engages cam 57 thereby to energize the raising field of the load adjusting motor, current flows from the common source 64, through brush contact 62, wire 86, switch 70 closed in up position, wire 87, actuating coil of relay 88, wire 89, and to the other side of the current source as described for relay 73, thereby energizing and closing relay 88 to permit current flow from wire 79, through wires 91 and 92 to energize the raising field 93 of load adjusting motor 66.

*Manual control of load adjusting motor.*—If it is desired to disconnect the automatic operation of load adjusting motor 66 and operate same manually while at the same time eliminating any possibility of the two controls being accidentally or intentionally placed in operation simultaneously, thereby possibly burning out the motor, the manually operable switch 77, shown for purposes of illustration as a push and pull switch, is moved to close either contacts 95 or 96 by contactor 97. In either position contacts 76 will be opened to disconnect the automatic control of the load adjusting motor, whereby the motor is placed solely under manual control.

When contacts 95 are closed current is supplied from source 85 through wires 98 and 99 to lowering field 82, and back to the source 85, through wires 83, 84. Closure of contacts 96 connects wire 98 with wire 100, energizing raising field 93 which is connected to other side of the current source 85, by wires 83, 84.

*Interrupter mechanism.*—This arrangement, Fig. 1a, periodically interrupts current supply to the load adjusting motor on each unit when under the control of its galvanometer controller, and in addition provides for the adjustment of the length of time for each impulse of current to the adjusting motors, whereby a series of control impulses are transmitted to the units followed by an interval with no control impulses. This allows the governor and load adjusting device to reach a position of stability and eliminates the difficulty which would be experienced due to "over-shooting" of the control mechanism caused by too many contacts being made by the contacting cams and fingers of the galvanometer control and too many impulses thereby being transmitted to the load adjusting motors without permitting sufficient time for the unit and its governing mechanism to reach a position of stability. The action of this interrupter mechanism will be seen to have an effect on the control system similar to the restoring mechanism on the governor, as it introduces a stabilizing element in the control equipment.

The interrupter 110 is placed in a neutral lead 111, connected to wire 112 of the negative side of the direct current supply 85, in such a manner that the current supply to the relay devices and other control equipment connected to neutral lead 111, may be interrupted. This neutral lead is connected through switch 109, on unit No. 1, and wire 113 to the common contact 64 of the galvanometer contact-making device 36. The interrupter device consists of a small motor 114 continuously driving a drum 115, on which is located a continuous slip ring 116 connected at all times to contact 117 of neutral line 111, which also has an adjustable contact 118. Additional strips on this rotating drum in the form of successively shorter segments are shown at 119, 120 and 121 each being electrically connected to the slip ring and arranged so that adjustable contact 118 can be moved from its slip ring position to any of the segments as required for the particular installation.

When contact 118 is at the slip ring position 116 the circuit is completed at all times through neutral lead 111. However, when contact 118 engages any one of the segments the length of time of contact will be in proportion to the length of the respective segment and during the remainder of the drum revolution, contact will be broken. It is thus seen that current may be supplied either continuously or intermittently to galvanometer contacting device 36 thereby obtaining the results previously described.

Figure 6:
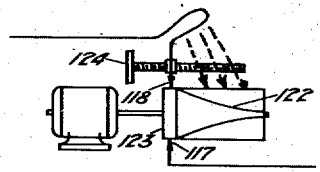

An alternative form of the interrupting device, Fig. 6, can be arranged with a tapered strip of metal 122 formed on the periphery of the drum. The portion 123 corresponds to slip ring 116 while contact 118 is adjustable along the cylinder by means of the hand wheel and screw 124 so that a fine control can be secured in the ratio of the time of contact to the time that current is cut off. This tapered strip could be made as a projection from the face of the drum so as to close a pair of contacts mechanically.

Figure 7:
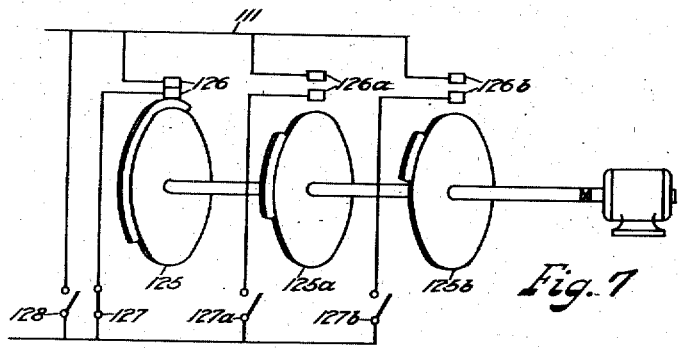
Fig. 7 is another form of interrupter that may be used.

The result can also be secured as shown in Fig. 7 by means of a series of continuously rotating cams 125, 125a and 125b, arranged on a shaft which closes sets of contacts 126, 126a and 126b and completes the neutral circuit 111 depending upon which one of the switches 127, 127a and 127b are closed. The cam surfaces of each cam are different so that the length of time of contact is varied in a similar manner to that effected by segments 119, 120 and 121 of interrupter drum 115. The effect of continuous contact 116 is secured by short circuit switch 128.

*Master load setter.*—In the arrangement whereby the unit is controlled from a master load setter 140 the manually adjustable resistance 13 is disconnected from the circuit previously described for individual unit control and the master load setter placed in operation by throwing switch 28 from position 29 to 141.

The master load setter 140 has a manually adjustable resistance 142 which is substituted for unit load setting resistance 13 in the parallel circuit containing resistance 12. While resistance 12 is still supplied with current from transformers 14 by wires 15 and 20, resistance 142 is supplied through wires 144, 145 and 146 from a transformer 143, which is a duplicate of 14.

A contact 147 in the master setter corresponds to contact 31 in the replaced resistance 13. Contact 147 transmits any potential through wire 148, switch A—2 in position I, connecting with wire 360, switch A—1, also in position I, wires 151 and 152, switch 28 closed in position 141, wires 27 and 24 through galvanometers 23 and wire 22 to contact 21 of resistance 12. Thus the galvanometer is bridged across a parallel arrangement of the unit load transmitting resistance 12 and master load setter resistance 142 in the same manner as when the unit load setter and transmitter resistances were connected in parallel with each other. Master load setter resistance 142 and unit load transmitting resistance 12 are connected by common wires 198 and 199 through switch 109 to insure the same potential on each resistance.

The control of output is accomplished in the same manner as with the individual load control on the unit when using dial 9 and its manually variable resistance 13. With the load set from the master load setter 140, by use of a suitably graduated dial 153 and its resistance 142, the galvanometer 23 moves in proportion to the difference in potential existing between contacts 147 and 21. The contact-making device 36 closes either contact finger 59 or 60, with its corresponding relay 73 or 88 respectively, depending upon whether the potential at contact 21 is above or below the potential existing at contact 147.

Figure 8:
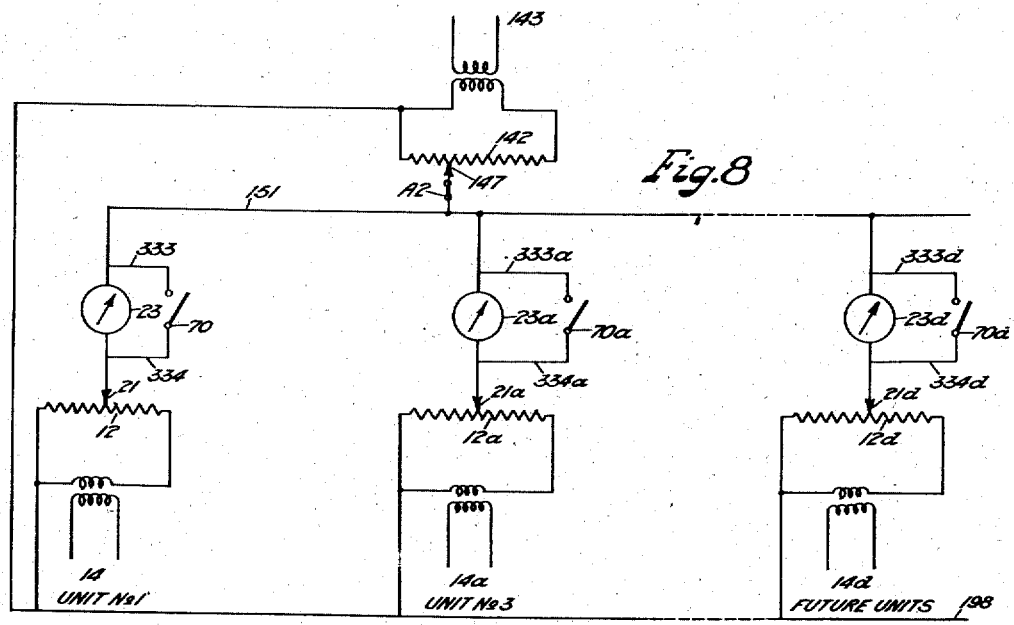
Fig. 8 is an isolated simplified diagram for effecting load distribution between units having either similar or dissimilar characteristics.

*Interconnected operation—Control by master load setter of duplicate units to give fixed combined load.*—With units Nos. 1 and 3 being duplicates in so far as having substantially identical operating characteristics, the control equipment and its operation for unit No. 3 will be identical with that described for unit No. 1. For simplicity elements in units 1 and 3 will be referred to with the same reference number but with the suffix letter a indicating unit No. 3. The description of unit operation of unit No. 1 will suffice for the unit operation of unit No. 3. However, where units 1 and 3 are both controlled from the master load setter 140, switch 109a is closed to energize the potential circuit from transformer 142a while switch 28a is placed in position 141a whereby unit load setting resistance 13a is disconnected from its parallel relation with unit load transmitter resistance 12a and the latter placed in parallel with master load setter resistance 142. The parallel connection is present because each of the resistances are connected to a common source of current through the respective transformers 143, 14 and 14a and wire 198 which commonly connects the resistances. The galvanometer 23a is bridged across master load setter resistance 142 and unit load transmitter resistance 12a from contact 21a, wire 22a, galvanometer 23a, switch 28a through wire 152a which connects to wire 152 and thence through switch A—1 to contact 147 in the same manner as with unit No. 1. This circuit when isolated and simplified is shown in Fig. 8. Hence galvanometer 23a will move in response to a difference of potential between points 147 and 21a in exactly the same manner as galvanometer 23 moved in proportion to the difference in potential between points 147 and 21 and will thereby operate the load adjusting motors 66 and 66a to give and maintain the proper load division between units 1 and 3. Thus in this interconnected operation, the single manually adjustable master resistance 142 by a proper load setting on dial 153 will determine the stable position for variable resistance 12 and 12a. The output on units 1 and 3 will thus be the same and will be equal to the amount indicated by dial 153 which has been calibrated in conjunction with the master load setting resistance 142 and the unit load transmitting resistances 12 and 12a and their dials 8 and 8a.

*Load control of dissimilar unit operating alone without master control.*—If two units have dissimilar characteristics so that, for example, best efficiency occurs at different loads on each unit, the two units should be so controlled as to operate simultaneously at different loads. To accomplish this when either or both of similar units 1 and 3 are in service at the same time that it is desired to operate unit 2, which is dissimilar to the other units, independent control equipment such as described with the other units is provided for unit 2 except that the manually adjustable unit load setting resistance 13b may differ from its corresponding resistances 13 and 13a by not being uniform in resistance in proportion to its angular displacement in which case dial 9b is calibrated accordingly.

The unit load transmitting resistance 12b may also differ from its corresponding resistances 12 and 12a in not being uniform with these resistances due to special requirements for other types of operation hereinafter described. As long as these special requirements are not present the resistance may be considered uniform.

A switch, generally indicated 109b, differs from its corresponding switches 109 and 109a by comprising two two-pole switches 109'b and 109"b also for special requirements. When switch 109b alone is referred to as being closed or opened it includes both switches. Otherwise the control equipment is the same as in the other units so that reference to corresponding elements in the units is by the same reference numbers except the suffix letter b indicates the elements in dissimilar unit No. 2, while suffix letter a as seen, denotes unit No. 3.

When unit No. 2 is operating alone switch 28b is in position 29b. The control operation is then the same as in the other units when operating alone so that the previous description therefor will suffice here.

*Dissimilar unit operating alone with master control.*—To control unit 2 from the master load setter there is provided a manually adjustable resistance 175 which is fixed on the same shaft with resistance 142. To disconnect resistance 13b and substitute resistance 175 therefor, switch 28b is set in position 141b whereby the circuit for galvanometer 23b now extends from contact 176 through wire 177, switch 109'b, wire 178, switch A—12 in position IV, wire 179, switch A—3, wire 180, switch 28b set in position 141b, wire 27b and 24b, through galvanometer 23b and wire 22b to contact 21b. The potential from transformer 143 is maintained across the terminals of resistance 175 by wires 144 and 145 each of which is connected respectively to terminal wires 181 and 105. The design of resistance 175 will be described later but for the present it will suffice to say that adjustment thereof will determine the load for unit No. 2. Any variation in potential between contacts 176 and 21b will cause current to flow through the circuits of galvanometer 23b depending upon whether the potential difference is caused by a load increase or decrease and thereby cause the load adjusting motor to raise or lower through the contact-making device 36b and the relays associated therewith.

The fixed or base load on this unit will therefore be determined by the setting on the master dial 155 and while the power generated by the unit may have temporary fluctuations, the power will always be brought back to the desired fixed load.

Any number of units similar to unit 1 can be added and controlled in the same manner as unit 3 is controlled with respect to unit 1 through its resistance 142 and corresponding devices on unit No. 1. Additional units similar to unit No. 2 may also be added and controlled in the same manner as unit 2 with respect to resistance 175. The interconnection of the controls of these units may be made in the same manner as described for unit No. 3 with respect to unit No. 1 illustrated diagrammatically in Fig. 8 where the potential control circuits are connected to common leads 151 and 198.

*Type IV operation; interconnected operation of similar and dissimilar units with master load control.*—Before describing the detailed control operation when dissimilar unit No. 2 operates simultaneously with similar units Nos. 1 and 3 through master load setter 140, there will be described first the manner in which the special design, and also the relation, between the two master load setting resistances 142 and 175, can be determined by the relation of the characteristic curves of unit 2 with respect to say unit 1.

It is a well established fact that for units of similar characteristics the total output of the combination must be divided equally between each unit in order to obtain the maximum combined economy for any particular setting. This is represented in Fig. 9 as a relation between the output on unit No. 1 and the output on unit No. 3 in which the abscissa $ob$ is equal to the ordinate $oc$ at any point on the output of the two units.

With relation to units having different characteristics it is necessary to establish curves of fuel or water consumption with respect to output. This is represented in Fig. 10 where curve $d$ shows the approximate performance of units 1 and 3 as described previously. However, in the case of unit No. 2 which has a different characteristic curve $e$, shown in Fig. 10, the slope of this characteristic curve is radially different from that shown on curve $d$ representing the performance of units 1 and 3.

It is furthermore a well established fact that the most economic distribution of load between two units of dissimilar characteristics may be determined from their characteristic curve by taking the slope of the characteristic curve at various points. For example, between $fg$ on curve $d$ the slope would be represented by the ordinate $gk$ divided by $fk$ and on curve $e$ by $jl$ divided by $hl$. If the slope is determined at each point such as $m$ an $n$ on each curve these can be plotted with respect to the discharge through the units shown as curve $p$, Fig. 11, for units 1 and 3 and $r$ for unit 2. The area represented under the respective curves is a direct proportion of the output of the respective units and from an analytical study it has been determined that the economic combination is that where the two units are operating at the points of identic slope of their characteristic curves as illustrated in Fig. 11.

With curves $p$ and $r$ the most economic combination for operating at a total discharge of Q would be represented by the points $s$ and $t$ where point $t$ corresponds to $Q_2$ on unit 2 and point $s$ corresponds to $Q_1$ on unit 1. This relation between discharge on the two units can be converted to output on the two units and a relation shown as curve $u$, Fig. 12, be secured. This represents the relation of the output on unit 2 with respect to the output on units 1 or 3 for the maximum economy of the combination of units 2 and 3 at any given load.

If this relation, modified if necessary for local requirements, is established then there is determined the relation between master load setting resistance 175 and 142 so that at any setting of dial 155 for a given total load the potential corresponding to the relation shown in curve $u$, Fig. 12, will be transmitted to the galvanometer circuits of those units which might be connected to the master load setter and consequently the connected units through their control mechanism will maintain this ideal relation.

*Economic load distribution between all units.*— In operation, to effect automatically the economic distribution of load between similar and dissimilar units 1, 2 and 3 when set at a constant value by the master load setter 140 the various switches of the operation selector switch 190 are arranged in a position to give what is herein called Type IV operation. This switch is shown for purposes of illustration as having a plurality of switches connected to a common push and pull rod so that all of the switches are moved simultaneously between certain contacts, some of which are dummies as will be seen by the fact that no wires lead therefrom. It will be understood of course that this selector switch may be of any suitable type having multiple contacts. In this arrangement potential from transformers 143, 14, 14a and 14b is applied to the combination master load setting resistances 142 and 175, and to unit load transmitting resistances 12, 12a and 12b as hereinbefore described. To insure a constant and uniform potential at the supply terminals of each resistance there is provided the multiple lead wire 198 previously described. The multiple lead is also connected through wire 201, across switch A—11, wire 202, across switch A—13, both of which are closed in this arrangement to make the necessary connections, and through wires 203 and 204 to terminal wire 17b of resistance 12b. Thus all of the terminal points of resistances 142, 175, 12, 12a, and 12b are connected to a common source of potential and also these resistances are connected to one side of the individual transformers while the other side of these transformers is connected to the terminal wires 105, 18a and 18b of the opposite end of the respective resistances. This as shown in the isolated diagram of Fig. 13, in effect arranges a group of resistances in parallel relation to each other, each of which has a constant potential across its terminals, and with one terminal of each resistance connected to the corresponding terminal of all other resistances thus insuring a constant potential at each of these particular terminal points.

In connection with the galvanometer circuits for units 1 and 3, potential is transmitted from contact 147, wires 148, across switch A—2 to wire 207, across switch A—1 to wires 151 and 152, switch 28 closed in position 141 and on through the galvanometer circuit including wires 27 and 22 to contact 21. Wire 151 transmits potential on through wire 152a, switch 28a set in position 141a, through wire 27a and galvanometer 23a back through wire 22a to contact 21a of resistance 12a.

In connection with unit No. 2 the potential at contact 176 is transmitted to contact 21b as previously described.

In connection with variable resistance 12b it is essential that the resistance in combination with resistance 176 be arranged with scale 155 and 8b to give a balanced potential between points 176 and 21b when the reading on scale 8b corresponds exactly with the reading on scale 155. Scale 8b is arranged to read uniformly the output of unit 2 as measured by wattmeter 10b.

Intermediate taps 350 and 351 are provided on this unit load transmitting resistance 12b in order to short-circuit any part thereof as may be desired for signalling or for other control functions where a portion of the resistance, for example, between 350 and 351, should be made constant instead of variable, and also to provide a potential which might be transmitted to either resistance 12 or 12a as might be required in connection with other functions of the control equipment.

*Frequency controller.*—By arranging a frequency sensitive bridge such as an impedance bridge consisting of an arrangement of condensers and non-inductive resistances, one pair in parallel and one in series, a galvanometer connected across this bridge will indicate variations in frequency above or below the normal setting as determined by an adjustment provided on the bridge.

Frequency controller 305 consists of an impedance bridge mentioned above, in which current is supplied at 306 and 307 and condenser 308 is arranged in parallel with non-inductive resistance 309 and a corresponding condenser 310 is arranged in series with a non-inductive resistance 311 with fixed resistances 312 arranged on the opposite sides of the bridge. Adjustable resistances 314 and 315 are provided for establishing the zero of the bridge corresponding to any desired standard frequency. A galvanometer 316 is excited by the field 317 which in turn is supplied with power through leads 318 and 319 the latter coming through switch 320 from one phase of the three-phase transformer 100 which is connected to the station bus which in turn is connected to the transmission lines carrying the outgoing power. Hence, the galvanometer 316 will be deflected due to variations of frequency in the power generating system. The alternating current supplied across terminals 318 and 319 therefore acts to supply the field and the galvanometer 316, 317 and also the current supply 306 and 307 across this frequency sensitive bridge. When the frequency increases or decreases from normal the galvanometer will be deflected in the proper direction due to the variation in current flow between the parallel arrangement of condenser 308 and resistance 309 as compared with the current flow through condenser 310 in series with resistance 311. The deflection of this galvanometer therefore indicates the departure from normal of the frequency of the current supply from 318 and 319. The galvanometer will also deflect in proportion to the departure of this frequency from normal, as the current across the terminals of the galvanometer and hence of the bridge 323 and 324, will be in proportion to the variation in frequency, provided the various elements of the circuit are calibrated and designed accordingly.

This deflection of the galvanometer 316 is transmitted to a contact making device generally indicated at 36f which in cooperation with galvanometer 316 is identical in construction and operation to contact making device 36 and its cooperating galvanometer 23. Corresponding elements of the two devices have the same reference number with suffix letter f indicating the elements of device 36f. Contacts 59f lower the output on the connected units in response to an increase in frequency and contacts 60f increase the load on the units in response to a decrease in frequency.

The current for the contact-making device is taken from the direct current source 85 by wires 112 and 325 through switch 320 and wire 326 to the neutral wire 64f of the contact-making device. The two contacts 59f and 60f are connected by the common leads 327 and 328 to all units in the station by the following arrangement. Switches 70, 70b and 70a are adapted when in down position to substitute the control impulses made by the frequency controller 305 for the load control impulses provided by the contact-making devices 36, 36b and 36a of the individual unit load controllers. In the operation of these switches, preferably only one at a time are in down position in order to avoid interference with the load distributing function of the equipment.

To accomplish this preferred operation of individual switch 70, 70a and 70b they may be combined in a single master frequency selector switch, similar to the operation selector switch 190, thus effecting the simultaneous operation of these individual switches by means of the single master switch with the contacts arranged, for example, to connect any one unit control circuit to the common leads 327 and 328 and with the remaining units connected to their individual unit load controllers. Under certain circumstances two or more units may be simultaneously connected with common leads 327 and 328.

*Type III—a Operation: Frequency control by all units or only one.*—If only unit No. 1 is connected to the automatic control apparatus, switches 70b and 70a are opened, switch 70 is closed in down position and the operation selector switch 190 is set in position III. The apparatus is then in condition whereby unit No. 1 can correct frequency variations from normal as indicated by the deflection of galvanometer 316 which is sensitive to the frequency supply from the generating equipment or from the generating system to which unit No. 1 is connected. This frequency correction is effected by adjusting the load on unit No. 1 in accordance with the frequency variation. With switch 70 in down position, contact 60f is connected to relay 88 by wires 327 and 87 to the other side of the source of current as previously described when current is supplied from contact 60. Closure of relay 88 energizes raising field 93 of the load adjusting motor 66 as previously described. Closure of contact 59f causes relays 73 to be energized by a current impulse transmitted through wire 328, switch 70 and wire 72 to relay 73 thereby to energize lowering field 82 of the load adjusting motor as previously described. Switch 70 by being in down position prevents any transmission of load control impulses to the load adjusting motor from the contact-making device 36. Switch 70 in down position closes contact between leads 333 and 334 to short circuit the leads to galvanometer 23 which is thereby maintained neutral and does not oscillate back and forth. Thus it is that this controller need not be operated when unit No. 1 is arranged to maintain frequency control. When switch 70 is in up position, leads 333 and 334 are open and hence the galvanometer 23 is free to move in response to differences in potential between variable resistances 12 and 13 or resistance 12 and 142.

In the frequency increases above some normal value as determined by the setting of the balanced position of the impedance bridge as indicated by the setting of a dial 336, the galvanometer 316 through the contact-making device 36f closes contact 59f and relay 73 causing the load adjusting motor 66 to decrease the output of unit 1. If this control impulse is not sufficient to restore the frequency to normal, galvanometer 316 causes additional contacts to be made with point 60f until the frequency is restored to normal. If on the other hand the frequency is below normal, galvanometer 316 will deflect in the opposite direction closing contact 60f and transmit a control impulse to relay 88 to raise the output of unit No. 1 by means of control motor 66 and thereby restore frequency to normal.

The length of time that contacts 59f or 60f are closed is, as explained with device 36, in direct proportion to the deflection of the galvanometer 316 which in turn is in direct proportion to the variation of frequency from normal. As a result the corrective control impulses transmitted to unit No. 1 are in proportion to the variation of frequency from normal.

It is a well established fact that variations in speed of generating equipment supplying electrical energy for commercial service, are a function of the difference between the power demand and the power supply. Hence, by means of the frequency controller 305 with its galvanometer 316, which is responsive to differences of frequency from standard, and contact-making device 36f and other relay equipment to actuate load adjusting motor 66, the variations between supply and demand are automatically compensated for, and hence tend to maintain the frequency at a constant value. While it is necessary to have a variation of frequency from normal to initiate operation of these control impulses still the control devices tend to reduce the departure of frequency from normal to merely a frequency tolerance which is of greatly smaller value than would be the case if the speed of the generating equipment was controlled solely by the speed governor without the automatic equipment as described. This frequency tolerance is extremely small since the galvanometer is far more sensitive to small variations in frequency than it is possible to build the commercial design of turbine speed governor, and also because the control device as arranged does not have the inherent speed drop from no load to full load which must be included with a prime mover governor. The usual permanent variation in final speed following a load change is automatically compensated for by my improved control device by restoring the speed to normal and hence correcting for the inherent speed change of the governor mechanism.

It will be seen, therefore, from the arrangement and operation of the frequency controller 305 and the control and relay mechanisms which actuate load adjusting motor 66, that this function of restoring speed to normal is independent of the output of unit No. 1, since the load controller 35 is disconnected from the devices acting upon load adjusting motor 66.

This same arrangement of frequency control can be applied to any additional units by merely closing one or both of switches 70b or 70a in down position whereby impulses supplied by contacts 59f or 60f will be transmitted to load adjusting motor 66b or 66a in exactly the same manner as described with load adjusting motor 66. Corresponding elements in each of the units for this arrangement also have the same reference number with the suffix letter a or b to indicate unit 3 or 2 respectively.

With any unit, frequency control thereof is independent of the load on the unit as indicated by its respective watt-meter. Hence, the output of the units is determined by the response of the individual speed governor to the control impulses on its respective load adjusting motor and has no relation to the load on any other unit in the combination. It is obvious from this arrangement as just described that the efficiency of the combination will not be maintained automatically at a high value as is the case with the operation of the units on type IV load control operation as described previously.

*Type III—b Operation (cont'd): Frequency control with economic load distribution: Similar units 1 and 3 operating: Dissimilar unit 2 shut*

*down or operating independently.*—In order that the efficiency of the combination is not sacrificed by operation on frequency control, the combination of units can be arranged as described hereafter to actually obtain frequency control with economic distribution of load between units when operating together.

Figure 1:
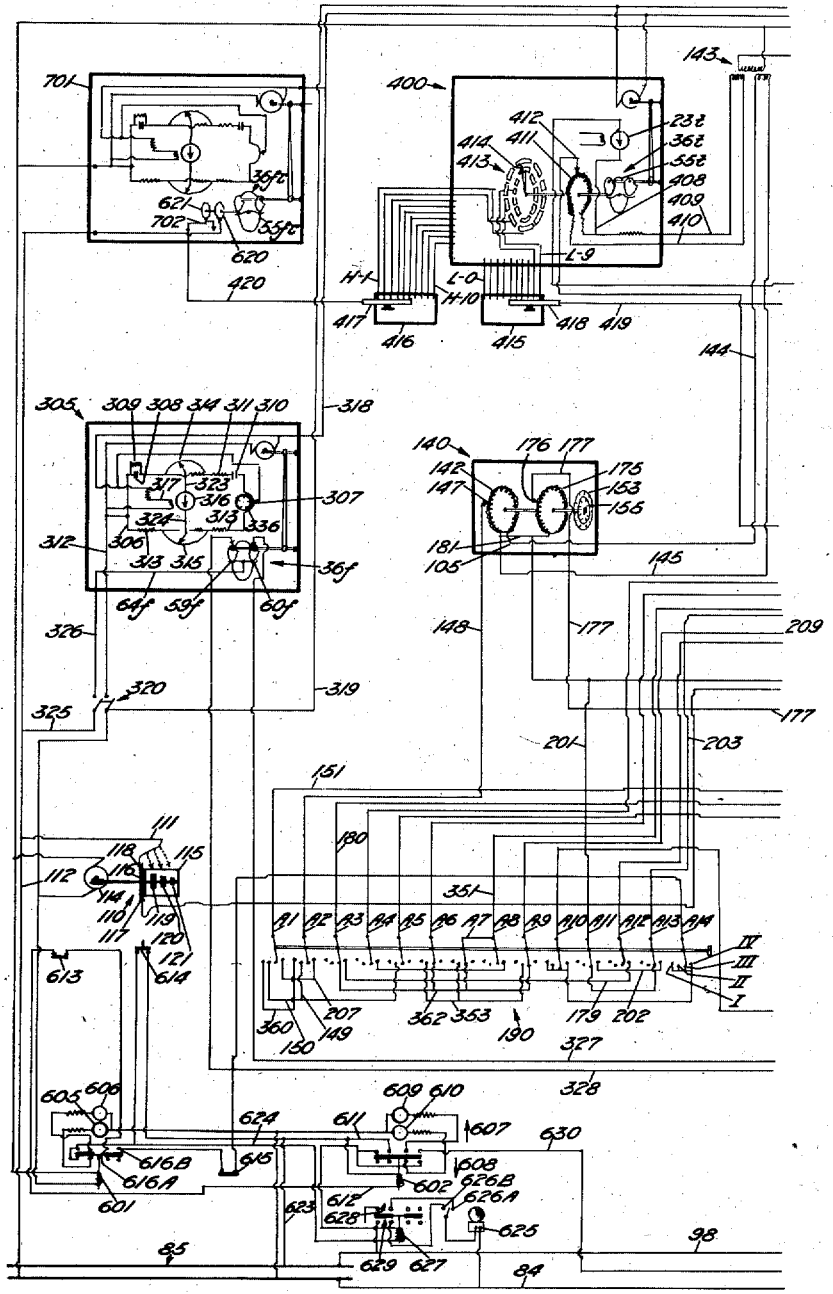

Assuming tha combined frequency and economic load distribution is desired with similar units 1 and 3 operating together while unit No 2 is inoperative, switch 70 remains in down position while switch 70a is placed in up position, see Figs. 1 and 8. The galvanometer 23a is then connected to be sensitive to any variation in potential between points 21 and 21a on units Nos. 1 and 3 respectively, the circuit being from point 21 through wire 22, galvanometer short circuit wires 334, switch 70, wires 333, switch 28 closed in position 141, wires 152, 152a, switch 28a closed in position 141a, wires 27a, 24a, galvanometer 23a and wire 22a to point 21a.

In this manner if the frequency departs from normal and the load is changed on unit No. 1, the increase or decrease in output causes wattmeter 10 to adjust resistance 12 and vary the potential at point 21, this variation in potential being transmitted through the circuit of galvanometer 23a as above described thereby adjusting relays 73a or 88a and hence operating load adjusting motor 66a in such a manner as to maintain the output of units Nos. 1 and 3 identical.

It will thus be seen that as the output of unit No. 1 is varied in accordance with the requirements for frequency control, the output of unit No. 3 is also varied in the same manner by the control impulses relayed from unit No. 1 to unit No. 3 due to watt-meter 10 operating to vary resistance 12 until such time as the potential at points 21 and 21a are equal and hence the two units have the same output.

Fig. 8 shows a diagrammatic arrangement of this load equalizing circuit where galvanometer 23 would be short circuited by wire 333 and 334 with switch 70 closed. The main operation selector switch 190 would have its individual switch A—2 open and hence point 147 would be disconnected from the common lead 151. With short circuiting switch 70a open, potential from point 21 is transmitted directly through galvanometer 23a to be balanced against the potential at point 21a. Deflection of galvanometer 23a as described above will cause the load to be adjusted on unit 3 until a balanced condition exists.

This same arrangement can be used with any number of similar units whereby the maximum combined efficiency is maintained at the highest value possible for the given station output by dividing the load equally between all of the units in service. This is the case where all the units have the same characteristics and simply requires the galvanometer circuit of galvanometer 23d, Fig. 8, of each additional unit to be bridged across its watt-meter operated resistance and the point 21 as above described for unit No. 3.

*Type III—c Operation (cont'd): Dissimilar unit controlling frequency with similar units following: Economic load distribution between all units.*—It is seen from the previous discussion where similar units 1 and 3 are operated together to control frequency, the combined load on these two units may rise or fall as is necessary to maintain normal frequency and meet the system load demand. However, units 1 and 3 have identical characteristics. Where a unit such as unit 2 has characteristics dissimilar to the other units and it is attempted to use this dissimilar unit to control the frequency it is seen that, as increased or decreased power is necessary to maintain frequency, unit No. 2 must have its power output controlled differently from units 1 and 3 if the most economic load distribution between the three units is to be maintained during this fluctuation in combined power output.

When all units were operated together for a fixed combined output, the master load setter 140 was used to effect the most economic distribution of power between the units due to the relation between master resistances 142 and 175. However, control by the master load setter 140 is only for a fixed combined output so that where a fixed combined output cannot be maintained as in the case of controlling frequency, the master load setter 140 cannot be used to maintain the proper power division between similar and dissimilar units. Hence to obtain the most economic distribution of power with a fluctuation in the total output, watt-meter operated resistance 12b is arranged so that its resistance characteristic bears a certain relation to the angular displacement of watt-meter 10b, so as to cause the potential at point 21b to be equal to the potential required at points 21 and 21a corresponding to the proper output of units 1 and 3 as fixed by the relation of curve u of Fig. 12. This relation is exactly the same as the relation between master resistances 142 and 175.

To accomplish the desired operation, switches 109, 109'b and 109a are closed, switch 109''b is open, switches 28, 28b and 28a are in positions 141, 141b and 141a, switches 70 and 70a are closed in up position while switch 70b is closed in down position. The operation selector switch 190 is in its position III. The circuits completed by this particular setting of the switches will be as follows: potential from point 21 is transmitted through wire 22, galvanometer 23, wire 27, switch 28 and wire 152 to 152a which leads to and across switch 28a to wire 27a, galvanometer 23a and wire 22a to point 21a. The potential at point 21b on resistance 12b is transmitted through wire 22b, short circuiting wires 334b and 333b closed by switch 70b, wire 27b, switch 28b, wires 152b and 180, across switch A—3 to wire 362, across switch A—9 to wire 209 across switch 109'b to wire 346 which is tapped into neutral lead 151. In this manner and as is more clearly seen from the isolated and simplified diagram, Fig. 13, the potential transmitted from point 21b is balanced by galvanometers 23 and 23a against potentials existing at points 21 and 21a respectively. This is shown in Fig. 13 by having switch A—2 open and switch A—3 connected to switch A—9 instead of A—12. Switch 70b is closed to short circuit galvanometer 23b and transmit the potential at point 21 directly to the common lead 151. The galvanometers 23 and 23a through their contact-making devices adjust the load on units 1 and 3 until the potential at points 21 and 21a respectively are balanced against the potential at 21b.

In special cases it may be desirable, as shown in Figs. 1 and 14, to include intermediate wires 350 and 351 to be tapped into resistance 12b so that the intermediate portion of resistance 12b can be short-circuited by wire 350, across switch A—6 to wire 362 and across switch A—7 to wire 351 which forms the other tap wire into resistance 12b. This insures that a constant potential will be maintained at contact 21a so long as it engages any part of the intermediate short-circuited portion. Figure 14 is the same as Fig. 13 except for the intermediate taps on slide wire 12b and the corresponding circuits leading up to the switch A—9. Beyond switch A—9 common lead 151 and other portions of the circuits are identical to Fig. 13.

From u, Fig. 12 it will be seen that when the load on unit 2 fluctuates between points v and w, the best combined efficiency of operation is had by keeping the load on units 1 and 3 substantially constant.

The constant load on units 1 and 3, during fluctuations in load on unit 2, is obtained when any part of the short-circuited portion of resistance 12b is engaged by contact 21b at which position a constant potential is had corresponding to the proper amount to maintain the proper relation between the loads on the units as shown by curve u. This potential is maintained on the galvanometer circuits of units 1 and 3. With a constant potential on these galvanometer circuits there is no deflection of the galvanometers and accordingly the contact-making devices 36 and 36a will be maintained in a neutral position, and thus not in any way actuate the load adjusting motors 66 or 66a. Power on these two units thus will be held at the desired constant value. However, if the system frequency changes, frequency controller 305 will cause current impulses to be transmitted to one or the other of relays 73b or 88b thereby actuating the load adjusting motor 66b in a direction depending upon whether the change in system load or frequency is above or below normal. Upon actuation of load adjusting motor 66b watt-meter 19b will also move to thereby change the power of unit 2 as required. This causes resistance 12b to be rotated without affecting in any way the power output of units 1 and 3 which remains constant so long as contact 21b is within the range of the short-circuited constant potential portion of resistance 12b.

However, in accordance with curve u, Fig. 12, it will be seen that from point w on, any increase in load on the dissimilar unit No. 2 should be accompanied by an increase in load on units 1 and 3. This is accomplished due to the fact that the point at which wire 351 is tapped into resistance 12b represents point w in curve u, whereby it will be seen that an increase in power output on unit No. 2, to the extent that contact 21b passes beyond tapped wire 351, an increase in potential will thereafter be impressed upon contact 21b and accordingly upon the galvanometer circuits of units 1 and 3 which will then increase their load in the proper proportion to this increase on unit No. 2. Thus the best combined efficiency for the three units will be had while still allowing fluctuations in the total output to maintain frequency or to meet the power demand on the system.

The same thing will hold true if the load on unit 2 is decreased below the arbitrarily fixed point v except that point 21 will move past point 350 in the direction of 196b, thus decreasing potential on common lead 151 and hence decrease the output on units 1 and 3. This arbitrary point is fixed from the point of view of practical considerations to reduce load on units 1 and 3 along line os instead of abruptly on the line oy. The amount of output on unit 2 represented by the displacement between points sv and y is fixed at a value equal to a small proportion of the output of unit 2 and does not seriously impair the combined economy. When this point is reached it indicates that the surplus units should be shut down so that the load can be carried for economically on fewer units.

*Type III—d Operation (cont'd): Frequency control by units Nos. 1 and 2 combined, or units 1, 2 or 3 alone.*—If for any reason less than three units are required a schedule of operation to be followed by the operator will indicate the proper unit to be shut down in order to maintain the best combined efficiency for the remaining units.

For example, if this should be unit No. 3, switch 109a would be opened, cutting off the control from this unit. The remaining two units 1 and 2 would then operate in the same manner as the combination of more than two units, because potential from point 21b would be transmitted through galvanometer 23 to point 21 and the load on unit 1 would increase or decrease in accordance with the variation of this potential as determined by the output of unit 2 through the watt-meter control of resistance 12b with its short-circuited portion. If unit 1 were no longer required for service, switch 109 would be opened and the circuit between points 21b and 21 would be broken, whereby unit 2 would then be operating along on frequency control and also following the requirements for frequency correction.

If however, unit 2 is no longer required for service then the frequency control could be transferred to either units 1 or 3. Assuming that unit 1 is required, switch 109 will be closed, switch 70 closed in down position and switch 320 closed, whereby unit 1 will have its output automatically adjusted in accordance with the deflection of galvanometer 316 as previously described.

If unit 3 is required for service in addition to unit 1, switch 109a is closed and switch 70a is closed in up position. The primary frequency corrective impulses are still transmitted through switch 70 in the down position to unit 1 from wire 327 or 328. Galvanometer 23 is short-circuited by switch 70 across wires 333 and 334 while galvanometer 23a is connected between points 21 and 21a to variable resistances 12 and 12a respectively so that as the load increases or decreases on unit 1 galvanometer 23a is deflected accordingly and acts to adjust motor 66a in such a manner as to maintain an output on unit 3 equal to the output on unit 1 which is the requirement for maximum economy of operation for the combination since it is assumed that units 1 and 3 have identical characteristics.

The same scheme of operation can be reversed and the primary impulses for frequency correction applied to unit 3 by closing switch 70a in down position and closing switch 70 in up position. The frequency corrective impulses initiated by galvanometer 316 are then transmitted to load adjusting motor 66a from wire 327 or 328. Galvanometer 23a is then short circuited by switch 70a across wires 333a and 334a while galvanometer 23 is placed between points 21 and 21a so that load adjusting motor 66 is operated to equalize the load between units 3 and 1.

In connection with the function of variable resistance 12b, it will be desirable in certain cases to utilize two resistances 12b' and 12b'' instead of one. The first of which (12b') will be connected in combination with resistance 175 of master load setter 140 with Type IV operation (station base load) and the other for use in connection with the distribution of load between units 1 and 3 when unit 2 is controlling frequency on type III operation. The operation selector switch 190, would connect point 176 with point 21b' on variable resistors 12b' for type IV operation. In the case of type III operation, the operation selector switch would connect common lead 151, and hence galvanometers 23 and 23a, to point 21b'' on resistance 12b''.

*Further units of similar and dissimilar characteristics.*—In principle any number of units can be operated in this manner provided the unit load transmitting resistances on the further units correspond to resistance 12, 12b, or 12a in the relation of potentials transmitted from one to the other in accordance with the requirements for maximum efficiency. Additional units of similar characteristics to units 1 and 3 can thus be added in any number desired by merely duplicating the equipment as outlined for either of these units. The necessary additional unit control equipment, designated by suffix letter d in Fig. 11, would be connected to common leads 151, 198, Figs. 1, 8, 13 and 14.

In connection with additional units having characteristics different from those of either units 1, 2 or 3, special supplementary variable resistances (12e) Fig. 14 corresponding to resistances 12, 12a, or 12b can readily be provided on one or more units so that any particular unit can determine the loading on any other unit for the requirements of maximum combined efficiency. This resistance 12e will transmit to some additional unit, for example unit 4, a potential from point 21e which, through its galvanometer 23g will cause the output to be adjusted until the potential at 21g equals potential at 21e and the additional unit is carrying the desired amount of load. The relation and arrangement of slide wires 12e with respect to the given units to which they are applied will be determined by economic studies similar to those described for Figs. 10, 11 and 12. It is understood of course that where certain units are particularly adapted by their characteristics to operate at fluctuating loads while other units should maintain constant load for purposes of economy, that the primary control of frequency should be placed on the units particularly adapted for variable load operation when that unit or units are in service in preference to placing the primary control on a unit which from its characteristics is not adapted to having the primary control of frequency placed thereon when units more adapted to this type of service are in operation.

*Type I operation.*—The purpose of this operation is to allow only a fixed output from units 1 and 3 by use of the master load setter and to control frequency with unit 2 which, aside from a protective circuit, is operated independently of the other units. The controls are arranged in such a manner that frequency controller 305 transmits frequency corrective impulses to unit 2 from either wires 327 or 328 through switch 70b closed in down position.

Operation selector switch 190 is set in position I whereby the controls of units 1 and 3 are connected through the master load setter 140 in such a manner that the output of units 1 and 3, or either of these units separately, are set by the position of the dial 153. The potential at point 21 is transmitted through wire 22 to galvanometer 23 and then through wires 24, 27, 152 and 151 to 23 and across switch A—1 to wires 360, across switch and across switch A—2 to wire 148 to point 147 on the master resistance 142. A similar circuit is also completed through galvanometer 23a between points 21a and 147, the circuit being from point 21a through wires 22a, 24a, 27a and 152a which is tapped into wire 151 of the circuit just described to connect with point 147. To complete these circuits, either or both of switches 28 and 28a are closed in position 141 and 141a depending upon if only one or both units 1 and 3 are in service. Switches 109 and 109a are closed and switches 70 and 70a are closed in up position. In this case no frequency control impulses are transmitted to the load adjusting motors on either units 1 or 3 thereby leaving units 1 and 3 solely under the control of the master load setter which permits these units to have only a fixed combined output as described elsewhere. Unit No. 2 will be placed on frequency control, however, by closing switch 70b in down position whereby its galvanometer 23b is short-circuited and frequency control impulses transmitted to its load adjusting motor from either of wires 327 or 328.

*Type II operation: Frequency control by unit No. 2, with base load and frequency standby on units 1 and 3.*—If the arrangement described as Type I operation is applied to plants where the variation in demand required for frequency control may exceed the capacity of a single unit, for example, unit 2, a method of inter-connected operation is arranged which will give the equivalent of type I operation and still meet the variation in demand.

To accomplish this, unit 2 is operated normally to maintain constant frequency and units 1 and 3 are maintained to give a fixed combined load, or base load, as set by the master load setter 140. A cross-connection defines a zone of normal operation in which the power capacity of unit 2 may fluctuate to maintain frequency during which time units 1 and 3 are maintained at a fixed combined load. Also, when unit 2 exceeds the limits at either end of this normal zone, it will operate in an auxiliary zone which relays potential to the controls of units 1 and 3 in such a manner as to increase or decrease the output thereof to assist unit 2 in maintaining frequency. This scheme is therefor the equivalent of unit 2 maintaining frequency while units 1 and 3 operate on base load with frequency standby connections which will cause these units to step in and assist unit 2 in controlling frequency if the power demand for frequency control exceeds or falls below the capacity of unit 2.

To effect this arrangement, see Figs. 1, 1a, and 14, operation selector switch 190 is set in position II and other switches are set in the same position as described when switch 190 is set in position I. Hence for normal operation unit 2 receives control impulses from frequency controller 305 with switch 70b set in down position. Units 1 and 3 are operated at a desired load as set on dial 153 of master load setter 140 all as described for type I operation. In addition the constant potential segment of resistance 12b is short-circuited by wire 350, across switch A—6 to wire 362 and switch A—7 to wire 351.

With the power of units 1 and 3 determined by the setting of dial 153 on master load setter 140 any variation in the output of units 1 and 3 from the potential as determined by point 147 will be corrected by galvanometers 23 and 23a respectively through their proper contact-making devices. However, so long as the power of unit 2 fluctuates between such limits that point 21b moves between the resistance taps of wires 350 and 351, no potential difference will be transmitted to point 21a through wires 22b, 346, switch A—5, wire 150, switch A—1, neutral wire 151, wire 152a, switch 28a, wires 27a and 24a and galvanometer 23a through wire 22a. Nor will a potential difference be transmitted through galvanometer circuit of unit 1 by wire 152 tapped on to neutral wire 151, switch 28, wires 27 and 24, galvanometer 23 and wire 22 to point 21. Point 147 on master load setter resistance 142 is also connected to the neutral lead 151 by wire 148 connected to and across switch A—2, to wire 149 which is connected to wire 150.

On the other hand if power on unit 2 increases so that point 21b is moved into the upper auxiliary zone between point 350 and the resistance terminal for wire 17b then an increased potential will be transmitted through the galvanometer circuits above described, adding to the potential at point 147 on the master resistance 142, thereby deflecting galvanometers 23 and 23a in a direction to cause the load adjusting motors 66 and 66a to increase the loads on units 1 and 3 in accordance with the amount of potential difference existing between point 21b and the resistance terminal of wire 17. The amount of this potential difference will be a function of the variable resistance windings on resistance 12b which has been designed for service in connection with position III of the operation selector switch and type III operation.

It will also be seen that when point 21b operates in the upper auxiliary zone the galvanometer circuits will have added thereto a definite potential in addition to that determined by the master setting of point 147 thereby increasing the loads of units 1 and 3 as some function of the displacement of point 21b from the resistance tap of wire 350.

If, on the other hand, point 21b moves to some position in lower auxiliary zone disposed between point 351 and the resistance terminal for wire 19b, potential will decrease on the common lead 151 and hence deflect galvanometers 23 and 23a in the direction for decreasing loads on units 1 and 3 to a lower value than that set by master dial 153. The amount of decrease in load will be in proportion to the difference in potential existing between point 351 and the position of point 21b when in the range between 351 and terminal 19b.

It may be seen therefore that in the normal range which is between points 350 and 351, the base load on units 1 and 3 is determined by the setting of master dial 153 and the potential on point 147. In actual practice this permits unit 2 to operate to maintain constant frequency without reference to the loads of units 1 and 3 so long as the output of unit 2 is maintained within the base load range corresponding to points 350 and 351. On the other hand, if requirements for frequency correction cause unit 2 to operate in the upper auxiliary range, which is fixed by practical considerations and the relation to the margins permissible for operation, then the load on units 1 and 3 is automatically changed to assist unit 2 in controlling frequency.

The effect of impulses of primary frequency control, as applied to unit 2 through its load adjusting motor 66b are relayed to units 1 and 3 through the change in position of variable resistance 12b caused by watt-meter 10b indicating the load change on its unit No. 2. This is in the same manner as with type III operation but without respect to the requirements for maximum combined efficiency, for this frequency standby function will be called into play regardless of the load as previously set for units 1 and 3.

As soon as the load on unit 2 has returned to a position between points 350 and 351 there is restored to common lead 151 a normal potential which is determined only by the potential existing at point 147. Hence units 1 and 3 return to their normal fixed output as set by the position of master resistance 142.

The above arrangement is provided as an auxiliary function of type I operation to provide for reserve capacity and frequency control from units in the plant which are operating on base load and is effective only when the requirements for frequency control exceed or fall below the predetermined range fixed as the zone between points 350 and 351 on resistance 12b.

*Totalizing of combined unit outputs.*—To provide for the convenience of the station operators means are provided for securing an indication of the total output. Also this means in combination with other phases of the invention provides for protecting the control equipment or for other purposes. This comprises as shown in Figs. 1, 1a and 15 auxiliary variable resistances 401, 402 and 403 which are simultaneously driven with their respective resistances 12, 12b and 12a, from their respective unit watt-meters. These auxiliary resistances which have a resistance characteristic varying directly with uniform angular displacement thereof, are supplied with a constant potential from special transformers. Resistance 401 is supplied from transformer 14 through leads 404 and 405. Corresponding elements in units 2 and 3 here again have the same reference numbers but with the suffix letters a and b to indicate units 2 and 3 respectively. Each resistance is arranged in series with the remaining resistances as shown in Figs. 1, 1a and 15, in such a way that the potential between points 434 and 431 on resistance 401 representing the output of unit 1, is added to the potentials between 435 and 432 on resistance 402; and 436 and 433 on resistance 403 so that the sum of these three potentials forms one side of a bridge circuit to galvanometer 23t. The other side of the bridge circuit is formed of neutral lead 407 connected to point 412 on variable resistance 411 in the totalizing watt-meter indicator. The potential existing between point 412 and 437 is balanced against the sum of the potentials on the other side of the galvanometer 23t. A deflection of this galvanometer 23t acts to move device 36t and rotating device 55t, similar in construction to contact-making device 36 and 55, except that 55t is rotatable whereas 55 may or may not be rotatable. The rotation of 55t adjusts resistance 411 with respect to point 412 in the proper direction to balance the potential at 437 against that at 434. This also moves a usual indicating device consisting, for example, of a shaft and drum connected to an indicating pointer or pen to read the scale corresponding to the total output of the units connected in parallel.

In addition to the indication of total station output the position of variable resistance 411 also determines the operation of a switch 413 which has concentric series of segmental contacts, the inner series being connected to a low limit switch 415 while the outer series is connected to high limit switch 416. The low limit switch has a series of wires marked L—1 to L—10, each wire leading from its own contact within low limit switch 415 to one of the inner segments. The next contact in low limit switch is connected to the next segment in the inner series and so on for the remainder of the low limit switch contacts and the inner segmental contacts. The same arrangement is used between the high limit switch 416 and the outer series of segments. An arm 414, connected to the shaft of disk 55t so as to be actuated thereby, carries at its outer ends two suitable sliding fingers, one for each series of segments. Each finger bridges the space between the successive contacts in its respective row so that successive pairs of segments are engaged simultaneously as the sliding finger moves from one position to the other.

The high and low limit switches are each provided with a movable contacting element 417 and 418 which may be of any suitable form such as a segment, adapted upon rotation to engage successive contacts and to remain in engagement therewith while moving in one direction and to successively disengage contacts when moving in the opposite direction or, as shown for purposes of illustration, the members 417 and 418 comprise slide bars adapted to engage successively the contacts of leads L—0 to L—9 and H—1 to H—10. Hence, by moving elements 417 and 418 to any intermediate position desired, wires 419 and 420 will be connected through a series of the wires say from L—10 to L—4 with a corresponding number of inner segments of switch 413, while line 420 will be connected through a series of leads say from H—1 to H—6, with an equal number of successive outer segments. For simplicity only two of the leads from each of the high and low limit switches have been shown connected to their respective segments. As potential is normally maintained on wire 419 it is seen that this potential will always be transmitted across switch arm 414 to wire 420 or long as contact arm 414 operates over those segments which are connected to switch elements 417 and 418, but that as soon as arm 414 goes outside of this group of segments, current can no longer flow from the inner series of segments to the outer series, thereby breaking the circuit in wire 419.

The contacts H—1 to H—10 correspond to the high or maximum output of the station in thousands of kilowatts, while L—0 to L—9 correspond to the low or minimum station output. Thus if it is desired that the automatic control shall be disconnected when the station output drops below 40,000 kilowatts low limit switch 415 would be moved to close the contact for lead L—4, whereas if the control is to be disconnected when the station output exceeds say 60,000 kilowatts, switch 417 will be moved so that all contacts up to H—6 will be closed. Thus it is seen that with switch arms 414 moving in proportion to the station output across the segmental contacts on switch 413 the complete circuit between lines 419 and 420 will be made in the zone of L—4 and H—6. If the load falls below 40,000 kilowatts, switch arm 414 moves out of the range of the active segmental contacts, whereby the circuit opens since the next segment for wire L—3 is not closed by switch 418.

In the same manner if the output of the station increases beyond 60,000 kilowatts the position of the switch arm 414 will be moved correspondingly and the circuit will be opened due to the fact that the contact point corresponding to H—7 is not closed by the device 417.

In this manner it is possible to set the maximum and minimum outputs of the station within which the control equipment can function of its own accord, but if either of these limits are passed, an open circuit results between leads 419 and 420, forming an integral part of a protective circuit which is connected to the proper relays and thereby cuts out the control current from the automatic panel as will be described under the heading of protective circuit.

The object of setting a high and low limit upon the station output is to give adequate protection for all conditions of plant operation. For example, with the control equipment set for type IV operation by having selector switch 190 in position IV, if a sudden increase in demand occurred which would indicate that some severe disturbance had taken place so that a sudden increase in plant output was required to maintain the normal frequency of the system, then when the output of the station had exceeded the setting as determined by the switch 416 current supply for the control equipment would be cut off and the plant would be free to operate as a manually attended governor operated station independent of the automatic control equipment and thus permit the plant to supply the excess power required during this emergency. The relay devices to be described under the heading of protective circuit also include an alarm bell which will notify the operator of the conditions of open circuit in the protective circuits.

In the same manner, where the plant is supplying base load and is operating at an output equal to the demand of a local company plus the demand of any inter-connection supplying energy to other transmission systems, then should one of these connected lines fail and reduce the output of the station momentarily to a value lower than the setting of the protective limit switch 415, the protective relays will open and cut off the control circuits from the automatic panel, and hence allow the station to operate as a manually attended plant without the automatic equipment functioning.

*Protective circuit.*—In connection with any control equipment such as described above, it is essential to provide protection of the generating equipment against certain hazards of operation which are present in any electrical generating plant and also to provide as far as possible against accidents which might result from a mistake on the part of the operating personnel. A first consideration is to protect the generating equipment from excessive frequency variations which might be caused by the manner of operating the system or by the furnishing of too much or too little load from the generating stations due to the actions of the automatic control equipment operating on fixed output. In the description of the load totalizing mechanism the high and low limit switches were described in detail and it was shown that an open circuit would result if the load fell below or exceeded the values set by the two contact making devices 415 and 416, Fig. 1. This circuit which would be opened by the totalizing watt-meter is connected in series through various points of the controlled wiring in such a manner that when any operation is made inaccurately or any change in type of operation is made, the power supply is automatically cut off from the control panel to the individual load adjusting motors 66, 66a and 66b.

This is accomplished in one specific embodiment of the invention by using interlocking relays between the alternating current supply, for the potential circuits and driving circuits of the various controllers and indicators, and the direct current supply to the contact making devices operating the load adjusting motors. As seen in Figs. 1 and 1a relay 601 was energized by current from the main alternating current supply is in up position and is in down position if this current supply is not available. In down position contacts are closed for signal lamp 605, showing that this relay is open, when in up position signal lamp 606 is illuminated showing that this relay is closed.

In the same manner a relay 602, which is connected to the direct current supply 85 when in up position, indicates through a lamp 609 that this relay is closed and when in down position contacts are closed for lamp 610 to indicate that this relay is open. The two relays are interlocked by means of leads 611 and 612 and the contact at point 616. If the circuit between contacts 616a and 616b is closed completely from 616a through other points on the protective circuit back to 616b, then if A. C. relay 601 is energized and moved to up position the circuit may be completed by push button 614 to energize the coil on relay 602. In this manner, relay 601 must be energized and in up position before relay 602 can be energized and moved to its up position. This insures that the alternating current supply for the control circuits is available before direct current can be supplied to the load adjusting motors through wire 630 and leads 78, 78b and 78a. On the other hand, if the direct current supply to the load adjusting motors fails relay 602 will open independently of relay 601 but if the alternating current supply should fail relay 601 will open and automatically cut out relay 602 thus preventing control contact being made to the load adjusting motors at any time that either of the current supplies to the control panel are disconnected.

Assuming that relay 601 is closed and the circuits completed between contacts 616a and 616b the connections starting from contact 616b include a trip button 615 which is so located on the switchboard of the regular control room of the power plant that the station operator may open this circuit and cut out relay 602 at will. In fact any opening of circuits 616a and 616b will result in the opening of relay 602. From trip button 615 a circuit first passes through A—14 and then through A—10 in selector switch 190. These two switches have corresponding connections for either type I, II, III or IV operation with neutral zones between each connection so that in moving from one position to the next position the circuit from A—14 to A—10 must be broken. This insures the attention of the operator and prevents the transfer from one type of operation to another without warning the operator by means of the opening of relay 602. From switch A—10 the protective circuit passes through switches 70a, 70b and 70 in either their up or down position, then passes through the upper central terminal of switch 28 to switch 28b, and on through the central upper terminal of switch 28a to wire 419 which is connected to the low limit switch 415 from which current passes through the selected leads L—0 to L—9 to the inner series of segmental contacts, then across arms 414 to the outer segmental contacts and out through the selected closed leads H—1 to H—10 of the high limit switch, then through wire 420 to the frequency recorder 701 to be referred to shortly.

The protective circuit returns from the frequency recorder to one side of the direct current supply 85. From point 616a to the opposite side of the contact 616 and relay 601 a circuit passes through a second trip button 613 located on the automatic control panel so that the circuit may be opened either at these points or from the main switchboard of the power plant. From this point, the circuit is carried through the actuating coil of relay 602 back to lead 611. Lead 611 passes through push button 614 which in turn is connected to lead 624 and thence to the other side of the direct current supply 85. With all other contacts closed except 614, the protective circuit may be re-energized and relay 602 closed to position 607. In no other way can this relay be closed and hence the manual attention of the operator is necessary to again place the control circuits in operation. If on the other hand any open circuits still exist in the leads between 616a and 616b the closing of push button 614 will fail to energize relay 602 and hence will indicate to the operator that such an open circuit still exists and that the control equipment is not ready to function automatically.

With the protective circuit arranged as described above, the circuit will be opened and relay 602 de-energized for any one of the following causes, for example, changing the position of selector switch 190, or the position of any one of switches 70, 70a, 70b, or switches 28, 28a and 28b. Thus the act of changing any one of these switches from one position to another automatically opens the protective circuit and opens relay 602 thus preventing the operator from moving the switches on this automatic control equipment without having some notification thereof. Thus the operator is prevented from transferring from independent operations to interconnected operations, that is, from position 29 to 141, or vice-versa without opening the protective circuit and relay 602.

From the totalizing watt-meter the protective circuit passes through two switches, in the frequency indicating instrument, which are set to be opened at predetermined points above and below normal frequency by a cam 620 for high frequency and a cam 621 for low frequency. The action of these cams is to permit a small spring switch 702 to lift away from its contact to which wire 420 is connected, thus opening the circuit when the cams assume the position determined by the position of the frequency recorder. This frequency recorder, with the exception of the addition of an arrangement 620 and 621 and contacts therefor, and the omission of a neutral wire connected to arm 50fr is identical in its operation and structure to the frequency impulse controller 305, and accordingly the contact making arrangement 36fr is identical to the detailed description of contact making device 36 of the controller for unit 1. The shaft for cams 620 and 621 is connected to the disk 55fr. The elements of this device are referred to with the same number used for device 36, except to add the suffix letters fr to indicate the frequency recorder.

In order to give a proper alarm in case relay 602 operates, a bell 625 is provided with switch 626 and relay 627, one side of the circuit being connected from line 84 to the bell 625 and the other side to the proper contact on relay 627 down to line 98 on the direct current supply 85. With relay 602 closed, contact is made which energizes the coil of relay 627 thereby closing the circuit at 628 whereby with the switch in position 626a the bell will ring. By shifting the switch from 626a to 626b the bell will be shut off, but if relay 602 opens to position 608, it will cut off the energized coil of relay 627 and this relay will move to down position 629 which will complete the circuit through switch 626b and again ring the alarm bell. In shutting off the alarm, the switch will be replaced to the position 626a and when relay 602 is energized relay 627 will also be energized and the alarm bell will ring. In this manner, with the auxiliary relay 627, the bell will give an alarm every time that relay 602 changes its position, and the act of shutting off the alarm bell automatically resets it for an alarm in the opposite position of relay 602. This effectively prevents any action of the operator in forgetting to replace the alarm bell and circuit ready for the next operation since this is done automatically when the alarm bell is shut off regardless of the position of relay 602.

When relay 602 is in position 607 the circuit is closed between lines 630 and 623 connected to the direct current supply 85, and hence the control impulses supplied to relays 73 and 88 and the corresponding relays on units 2 and 3 will actuate these relays to complete the circuits in the proper direction to the load adjusting motors 66, 66b and 66a. When relay 602 is in position 608 this circuit is open and no control impulses can be sent to the load adjusting motors by means of the automatic equipment which places the operation of load adjusting entirely upon the manual switches 77, 77b or 77a, located on the bench board in the control room and shown on the drawings near the load adjusting motors. This in turn will bridge contacts 95 or 96 so as to increase or decrease the load manually on the particular unit altogether independent of the automatic equipment. On the other hand, if any of the control equipment continues to operate, that is, if the alternating current supply through relay 602 is not cut off the direct current control impulses to the individual units are eliminated and even though the contact making devices 36, 36b and 36a continue to operate they will have no effect on the load of the individual units.

Thus for any one of the reasons outlined above due to the change in position of the particular switch or a variation in plant output or plant frequency beyond the desired limits, control impulses from the automatic panel are cut off and the plant is permitted to operate as a manually attended station without reference to the automatic control equipment.

Alternating current is supplied to the control equipment through a series of transformers 700, 700a, 700b, and 700c and by proper connections as indicated on the drawings the necessary current is furnished to the operating motors of the various controllers and through the respective transformers 143, 14, 14b and 14a which reduce this current down to the desired value of voltage. The alternating current supply is also carried to a frequency indicator 701 as well as to frequency controller 305, in this manner giving an indication of the system frequency at all times and effecting operation of the protective circuit by means of the cams 620 and 621 operating between predetermined values of frequency.

The galvanometers wherever shown are of the alternating current type, and their operation is dependent upon having their respective fields and armatures connected to a common source of power as by leads G—1 and G—2, leading from an auto transformer 700' to give a suitable voltage.

In place of the direct current supply 85, an alternating current supply may be employed if desired by having relays 73 and 78, 602, 627 and motor equipment 66 adopted for that form of current.

As shown in Fig. 16 a disc is secured to the shaft actuated by the disk 55fr so that either one or the other of cams 851 or 852 will be rotated into engagement with contacts 853 so as to close the same. Upon closure of these contacts suitable circuit will be completed through wires 854 so as to either signal the operator by bell or lamp that a certain total output is generated by the units. The angular displacement between cams 851 and 852 will determine the maximum and minimum limits for the total power output before the signal is given or other units added.

In the modification shown in Fig. 17 the load adjusting motor 800 is operated by current impulses in accordance with the load variations as indicated by a watt-meter generally indicated at 801. This watt-meter may be of any usual type having an element 802 oscillated upon actuation of the watt-meter. The watt-meter is connected to the generator 803 whereby upon an increase in power, arm 802 is moved upwardly into an engagement with contact 804. This connects part of a circuit from a battery 805, through wire 806 to the lowering relay 807, thence through wire 808 through contact 804 and arm 802 to contact 809 which is adapted to be intermittently engaged by a wedge-shaped contact 810 disposed on the periphery of a continuously rotated cylinder 811 of the interrupter. When this contact is made the circuit is completed through contact 812 which is adapted to be in continuous engagement with a continuous segment of plate 810. When the power decreases from a predetermined value the watt-meter operated element 802 moves downwardly into engagement with contact 813 whereby the relay 814 for raising the load is energized from the battery 805. The interrupter is of the type shown in Fig. 6, and its function is the same as in the other modifications. The contacts 804 and 813 may be mounted for mechanical adjustment either relative to each other so as to vary the gap therebetween, or both moved in the same direction. By varying the gap between the contacts the amount of variation in load from a predetermined value may be adjusted.

In this modification the equipment may be used to effect frequency control simply by the provision of a frequency responsive device instead of a watt-meter which frequency device will have an oscillating arm or any other suitable type of arm such as 802.

Fig. 18 shows mechanical means for distributing the load between the respective units in accordance with their individual characteristics so as to obtain the best combined economy of operation. A totalizing watt-meter generally indicated and diagrammatically shown at 825 is releasably connected to a drum 826 through a manually operable clutch 827 while the other end of the drum is provided with a suitable hand wheel 828. The periphery of the drum is provided with a series of cams 829, 830 and 831 each formed in accordance with the theory previously discussed for obtaining maximum economy of operation with units having different characteristics. In this figure it is seen that no two units have the same characteristics and yet upon variations of the watt-meter the total load between the individual units will be properly proportioned by mechanism actuated by the cams. This mechanism is the same for each unit and hence the description of one will suffice for all. A cam follower 832 is moved axially on the drum 826 so as to move one or the other of adjustable screw contacts 833 or 834 into engagement with an oscillating arm 835 of the unit watt-meter 836. When screw 834 and arm 835, or 833 and 835 make contact, relay mechanism generally indicated at 837 will control the circuits 838 to energize the load adjusting motor 839 thereby to raise or lower the load on the particular unit depending upon which set of contacts are connected which in turn depends upon whether the total load is increased or decreased. As the load on the particular unit is adjusted its unit watt-meter will move arm 835 until the contact is broken. Hence it will be seen that if certain of the cam followers 832 are moved axially a greater distance than other of the followers for a given angular displacement of the drum 826 it will require a greater degree of power adjustment of one unit than for another unit in order to disengage the watt-meter arms of the respective units from their screw contacts. By adjusting the gap between the two screws the sensitiveness of the arrangement may be varied.

If it is desired to have a fixed total output, clutch 827 may be disengaged and the drum 826 manually adjusted by handle 828 to a point where the desired fixed combined load is obtained. In this case the division of load between the units will be for maximum economy of operation.

To obtain frequency control with this modification in addition to the load control, contact making frequency meter 840 may be used to make contact between point 841 and arm 842 or between arm 842 and point 843 depending upon whether the frequency variation is above or below normal. Closure of either of these sets of contacts causes energization of relays generally indicated at 844 to operate the load adjusting motor 839 by the circuit including wires 845.

The frequency meter is connected to the main line through a suitable bus. While suitable sources of current for operating the relays and load adjusting motors are shown as batteries it will be understood that any other suitable source of current may be used.

The load adjusting motor 800 shown in the modification of Fig. 17 is preferably of a high speed type for which an interrupter such as 810 is particularly adapted while in the modification shown in Fig. 18 the motor is of the slow speed type thus permitting the same to be used without an interrupter.

The general methods of operation for the several phases of my invention and also the operation of the component parts or circuits thereof are better understood by reference to the description under the particular heading for each of these methods of operation. From these specific descriptions it will be seen how an operator may choose any one of the several types of operation by the manipulation of a very limited number of elements, with the result that the station power generating equipment is adjusted automatically to obtain the many desirable results previously mentioned.

It will of course be understood that the watt-meters are merely one specific form of mechanism by which the load on the various units might be indicated. Other forms of devices performing broadly the same functions of the watt-meters would include a device for indicating the gate opening, the stroke of the governor, the flow of the power medium or the pressure variations caused by this flow, or in a hydraulic plant the variations of head or tail water occasioned by changes in the power or the speed of the unit where the power varies as a function of the governor operation. These devices being responsive to some function of the power output are herein considered as comprising broadly, means responsive to variations in the power output of the unit and each of these devices would be connected to the load transmitting resistances in a suitable manner so as to adjust the same in the same manner as with the watt-meters.

While various modifications and arrangements have been shown it will of course be understood by those skilled in the art that various other changes and rearrangements of parts may be made while maintaining the principles of the invention hereinbefore outlined and without departing from the spirit of the invention as set forth in the appended claims.

I claim:

1. Apparatus for controlling a prime mover operated electrical generating unit comprising, in combination, operating mechanism for varying the power of the prime mover to maintain a substantially constant output thereof, means responsive to variations in the power output of said unit, means controlled thereby and adapted to impart a series of control impulses to said operating mechanism, and means for temporarily interrupting said control impulses automatically during operation of the apparatus.

2. Apparatus for controlling a prime mover operated electrical generating unit comprising, in combination, operating mechanism for varying the power of the prime mover to maintain a substantially constant output thereof, means responsive to variations in the power output of said unit, means controlled thereby to adjust said operating mechanism, and means adapted to produce periodic substantially uniform interruptions of said adjustment.

3. Apparatus for controlling a plurality of prime mover operated electrical generating units comprising in combination operating mechanism for varying the power of each of the prime movers, watt-meters, one for each of said units and means controlled by each of said watt-meters for adjusting the operating mechanism of each of said units to maintain a substantially constant load on each unit, said means including means common to each of said units for setting a predetermined combined load therefor.

4. Apparatus for controlling a plurality of prime mover operated electrical generating units, each having operating mechanism for varying the power of its respective prime mover and each of said units having different characteristics, means responsive to the power output of said units, and means controlled thereby for distributing the combined output of the units in a predetermined proportion so as to obtain substantially maximum combined economy of operation of said units.

5. Apparatus for controlling a plurality of prime mover operated electrical generating units of different characteristics, comprising, in combination, means responsive to the power output of said units, means for determining the combined load on said units, and means controlled by said power responsive means to distribute the combined output between said units in some predetermined proportion automatically when any given combined output is set for said units.

6. Apparatus for controlling a plurality of prime mover operated electrical generating units of different characteristics comprising, in combination, means responsive to the power output of said units, means for setting the combined load on said units, means controlled by said power responsive means to distribute the combined output between said units in some predetermined proportion automatically when any given combined output is set for said units and for maintaining the combined output of said units substantially constant.

7. Apparatus for controlling a plurality of prime mover operated electrical generating units comprising, in combination, means for varying the power of the prime movers, means for setting a fixed combined output of said units, and means whereby upon the setting of the fixed combined load it is distributed automatically between said units in a predetermined proportion for effecting a substantially maximum economy of operation for the combined units.

8. Apparatus for controlling at least three prime mover operated electrical generating units comprising, in combination, operating mechanism for varying the power of each prime mover, means for setting a given combined output of said units, and means whereby the combined load is distributed between said units automatically in accordance with the given output and in a predetermined proportion for effecting a substantially maximum economy of operation for the combined units.

9. Apparatus for controlling at least three prime mover operated electrical generating units, at least one of which has characteristics different from the others comprising, in combination, means for setting a given combined output of all the units, and means for distributing the load in predetermined proportions between the various units automatically in accordance with the setting of the given output.

10. The combination set forth in claim 9 further characterized in that said means for automatically distributing the load has provision for effecting load distribution to obtain maximum economy of operation for the combined units.

11. Apparatus for controlling at least three prime mover operated electrical generating units, at least one of which has characteristics different from the others, comprising, in combination, a master load setter mechanism adapted to set a predetermined combined output of said units, and means cooperating with said master load setter for distributing the load between said units automatically to effect a combined output equal to the output set by said master load setter.

12. The combinaion set forth in claim 11 further characterized in that said master load setter has control elements of the same number as there are units having different characteristics.

13. Apparatus for controlling and selectively operating any two or more of several prime mover operated electrical generating units comprising, in combination, means for setting a predetermined combined output, means whereby the load is distributed between at least two of said units to give the fixed combined output, and means whereby when another unit is operated and its output added to the other units the fixed combined load will be redistributed automatically between all of the units being operated.

14. Apparatus for controlling and selectively operating any two or more of several prime mover operated electrical generating units comprising, in combination, means for setting a predetermined combined output, means whereby the load is distributed between at least two of said units automatically in accordance with the fixed combined output and means whereby when a plurality of additional units are operated the combined load will be redistributed automatically between all of the units which are operating.

15. Apparatus for controlling a plurality of prime mover operated electrical generating units comprising, in combination, means for operating at least one of said units so as to obtain substantially constant frequency, and means whereby another unit operated in parallel therewith, is maintained at a substantially predetermined fixed output automatically during changes in the power supply of the first unit.

16. Apparatus for controlling a plurality of prime mover operated electrical generating units comprising, in combination, means for operating said units with a predetermined load distribution therebetween, means for varying the combined power output of said units automatically in accordance with variations in frequency thereby to maintain substantially constant frequency, and means whereby during the variation in combined output of said units said distributing means automatically maintains the predetermined distribution of power between the units, at least two of said units having characteristics different from each other.

17. Apparatus for controlling a plurality of prime mover operated electrical generating units comprising, in combination, means for proportioning the output between two or more units in a predetermined manner so as to obtain substantially maximum economy of operation with the combined operation of said units, and means for changing said combined output automatically in accordance with frequency variations while automatically maintaining the proper load distribution between the units for maximum economy of operation.

18. Apparatus for controlling a plurality of prime mover operated electrical generating units, at least one of which has characteristics different from another comprising, in combination, a resistance element for each of said units, electrical circuits, means whereby said resistances control potentials impressed upon said circuits automatically in accordance with a predetermined relation between the characteristics of said units, and means controlled by said circuits for adjusting the power of the units, the resistance for one unit having a short circuited portion.

19. Apparatus for controlling a plurality of prime mover operated electrical generating units, at least one of which has characteristics different from another comprising, in combination, a resistance element for each of said units, electrical circuits, means whereby said resistances control potentials impressed upon said circuits automatically in accordance with a predetermined relation between the characteristics of said units, and means controlled by said circuits for adjusting the power of the units, the resistance for one unit having a short circuited portion, and means whereby during other operations of said unit the short circuit is cut out.

20. Apparatus for controlling a prime mover operated electrical generating unit comprising, in combination, means for controlling the power output of said unit, and means for setting a high and low limit for the power output to disconnect said controlling means automatically when either of said limits are exceeded.

21. Apparatus for controlling a prime mover operated electrical generating unit comprising, in combination, means for controlling the power output of said unit, and means for setting a high and low limit for the frequency to disconnect said controlling means automatically when either of said limits are exceeded.

22. Apparatus for controlling a plurality of prime mover operated electrical generating units comprising, in combination, means for controlling load distribution between said units, and a protective circuit having means controlled by said load distribution means whereby the load distribution means is rendered ineffective during certain operations thereof.

23. The combination set forth in claim 22 further characterized by the provision of means having at least one hand switch in said circuit whereby to restore operation of said control means said hand switch must be first operated.

24. Apparatus for controlling a plurality of prime mover operated electrical generating units comprising, in combination, electrical means for automatically controlling the output of said units with predetermined modes of operation, and a protective circuit having means connected with and controlled by said electrical means whereby when changing from one operation to another said electrical means is automatically disconnected.

25. Apparatus for controlling a plurality of hydro-electric power units comprising, in combination, a speed responsive governor for each of said units and each having a load adjusting motor, and means for controlling said load adjusting motors automatically in accordance with a predetermined schedule of operation, the functions of said controlling means being superimposed upon the functions of the governor.

26. In combination, apparatus for controlling the combined operation of a plurality of prime mover operated electrical generating units wherein a plurality of the prime movers thereof have dissimilar operating characteristics with respect to each other comprising, means responsive to the output of said units, and means controlled thereby whereby the combined output of said units is distributed between them automatically in accordance with substantially a predetermined schedule of maximum economic operation of said units.

27. In combination, apparatus for controlling the combined operation of a plurality of prime mover operated electrical generating units wherein a plurality of the prime movers thereof have dissimilar operating characteristics with respect to each other comprising, speed responsive governor means, means controlled by said governor means for varying the power input to said units in accordance with the variations in speed thereof from a predetermined normal value, and means for additionally controlling the input to said units whereby the combined output thereof is distributed between the units automatically in accordance with substantially a predetermined schedule of maximum economic operation of said units.

28. In combination, apparatus for controlling the combined operation of a plurality of prime mover operated electrical generating units comprising, means responsive to the output of said units, and means controlled thereby whereby the combined output of said units is distributed between them automatically in accordance with substantially a predetermined schedule of maximum economic operation of said units.

29. Apparatus for controlling a plurality of prime mover operated electrical generating units connected for parallel operation comprising, in combination, means whereby at least one of said units is adapted to control frequency, and means including frequency standby connections whereby other of said units will automatically step in and assist the frequency unit in maintaining constant frequency when the power demand on the frequency unit varies from a predetermined value.

30. Apparatus for controlling a plurality of prime mover operated electrical generating units connected for parallel operation comprising, in combination, means whereby at least one of said units operates for maintaining frequency, means whereby other of said units operate on base load, and frequency standby connections adapted to cause said base load units to step in and assist the frequency unit in maintaining constant frequency automatically when the load demand for frequency control varies from a predetermined value.

31. In combination, an electrical system, a plurality of generators disposed to supply power to said system, a prime mover for driving each of said generators, means for adjusting the power produced by each prime mover, load-responsive means influenced by the total-power output of all of said generators, control means for the power-adjusting means of each prime mover, and means whereby all of said prime-mover-control means are acted upon by said load-responsive means, each of said control means having response characteristics graded in a predetermined manner to effect predetermined readjustments in the distribution of load among the said several generators in response to changes in the total output of all of the generators.

32. The combination with an electrical system having a plurality of generating units disposed to supply power thereto, of load-adjusting means for each of said units, means responsive to the total power output of all of said units, and control means for each of said unit-load-adjusting means, all of said control means being acted upon by said total-power-responsive means and each having graded response characteristics to cause the load distribution among the several generating units to change in a predetermined manner as the total power output of all of the units is changed.

33. In combination, an electrical system, a plurality of generators disposed to supply power to said system, driving means for each of said generators, means for adjusting the power of each of said driving means, load-responsive means influenced by the total-power output of all of said generators, control means for each of said power-adjusting means, and means whereby all of said control means are acted upon by said load responsive means, each of said control means having response characteristics graded in a predetermined manner, such that, throughout the total-power output range of the generator group, the load supplied by each of the several generators will be so regulated that the maximum-operating-efficiency load-distribution combination for the group will be effected.

34. In combination, an electrical system, a plurality of sources disposed to supply power to said system, means for adjusting the power supplied by each of said sources, load-responsive means influenced by the total power supplied by all of said sources, control means for each of said power-adjusting means, and means whereby all of said control means are acted upon by said load-responsive means, each of said control means having response characteristics graded in a predetermined manner so that for changing values of total power suppplied by the said several sources, the distribution of load among them will be automatically readjusted to maintain the maximum-operating-efficiency load-distribution combination for the entire group of sources.

35. The combination with a plurality of electrical generating units disposed to supply power to a system, of load-adjusting means associated with each of said units, load-measuring means responsive to the total power delivered by all of said units, control means for each of said unit-load-adjusting means having response characteristics graded in a predetermined manner, and means whereby all of said control means are simultaneously acted upon by said load-measuring means, said combination being thus disposed to vary in a predetermined manner the distribution of load among the said several generating units as their total-power output changes.

36. In an electrical power system comprising a plurality of parallel-operated generating units each of which has load-adjusting means, the combination of load-distribution regulating equipment for causing the total load supplied by all of the units to so divide among them, that, for any given value of total output, each unit will tend to supply a load which is within its maximum-efficiency operating range, said equipment comprising load-totalizing means responsive to the power delivered by all of said units, control means for each of said unit-load adjusting means having response characteristics graded to accord with the efficiency load characteristics of the associated generating unit, and means whereby all of said unit-control means are similarly acted upon by said load-totalizing means.

37. The combination with a plurality of electrical generating units disposed to supply power to a system, of load-adjusting means associated with each of said units, load-measuring means responsive to the total power delivered by all of said units, control means for each of said unit-load-adjusting means, and means whereby all of said control means are simultaneously acted upon by the load-measuring means, each of said unit-control means having response characteristics predeterminedly graded so as to effect, for all values of total power supplied by the generating-unit group, that load distribution among the units which results in maximum operating efficiency for the group.

38. The combination with an electrical system having a plurality of generating units disposed to supply power thereto, of load-adjusting means for each of said units, means responsive to the total power output of all of said units, and control means for each of said unit-load-adjusting means, all of said control means being acted upon by said total-power-responsive means and each having response characteristics graded to so accord with the efficiency-load characteristics of the associated unit and those of the other units in the group that as the total output of all the units is changed the load distribution among the said several units will be so adjusted as to maintain the maximum-operating-efficiency distribution combination for the entire unit group.

39. A load-efficiency regulating system for a plurality of generating units disposed to supply common electrical power circuits comprising, in combination, means for producing a mechanical control force for each of said units, means for maintaining the output of each unit in such adjustment that it balances the associated control force, a device, including a mechanical member shaped to accord with the efficiency-load characteristics of the associated generating unit, for controlling the magnitude of each of said control forces, and means disposed to effect simultaneous operation of all of said devices in accordance with changes in the total output of all of said generating units.

40. An efficiency-load regulator for a plurality of generating units disposed to supply power to an electrical system comprising, in combination, load-adjusting means for each unit, a load regulator for each of said units, means for causing a mechanical control force to act upon each of said load regulators, means whereby each load regulator adjusts the output of its generating unit to conform with the control force acting thereon, a device having a force-varying curve shaped in a predetermined manner as to conform with the efficiency-load characteristics of the associated unit, disposed to control the magnitude of each of said mechanical forces, and means disposed to effect simultaneous operation of all of said devices in accordance with changes in the total output of all of said units.

41. In combination, a plurality of generating units disposed to supply power to an electrical system, a load-regulator for each of said units, means for impressing a mechanical control force upon each of said load regulators, means whereby each of said regulators is caused to adjust the output of the associated generating unit in accordance with the control force acting thereon, a mechanical means having force-varying characteristics specially graded to simulate the shape of a desired load-change curve for the associated generating unit disposed to adjust the magnitude of each of said control forces, and means disposed to effect simultaneous operation of all of said mechanical means in accordance with changes in the total output of all of said generating units.

42. In combination, a plurality of generating units disposed to supply power to an electrical system, a load-regulator for each of said units, means for impressing a control force upon each of said load regulators, means whereby each of said regulators is caused to adjust the output of the associated generating unit in accordance with the control force acting thereon, a mechanical means having force-varying characteristics graded to accord with the efficiency-load-characteristics of the associated generating unit, disposed to adjust the magnitude of each of said control forces, a control device, power-responsive apparatus connected with the output circuits of all of said units and disposed to influence said control device in proportion to the total power output of the generating units, means for setting up a counter-influence upon said control device in opposition to the first-named influence, means operated by the control device for adjusting the magnitude of said counter-influence and means responsive to the position of said control-device-operated means for effecting simultaneous operation of all of said mechanical means.

43. In combination, a plurality of power units arranged to operate in parallel, means for distributing the total load between said units in accordance with a predetermined plan which varies the proportion of the total load carried by a unit when the total load changes, and apparatus responsive to total load for actuating said means.

44. In combination, a plurality of power units arranged to operate in parallel, and means operating in accordance with a predetermined plan for smoothly varying the distribution of load among said units including means responsive to variations in total load.

45. In combination, a plurality of power units arranged to operate in parallel, means for controlling the distribution of load between said units in such a manner that the overall efficiency of all of the units as a whole is a maximum for various values of total load, and apparatus responsive to total load for controlling said means.

46. In combination, a plurality of parallel connected electrical power units having dissimilar input-output curves, and means for adjusting the division of load between said units in a manner to maintain maximum overall efficiency of all of said units during variations in total load, and apparatus responsive to total load for controlling the operation of said means.

47. In combination, a plurality of parallel connected electrical power units having dissimilar input-output curves, individual load regulators for each unit, and means responsive to the total load of all of said units for adjusting the relative settings of said regulators so that the distribution of the total load among the units produces maximum overall efficiency of the units as a whole.

48. In combination, a plurality of parallel connected electric power units, means including a separate cam for each unit for adjusting the load on each unit in accordance with the angular position of the cam associated with each unit, and means for simultaneously changing the angular positions of the cams.

49. In combination, a plurality of parallel connected electric power units, means including a separate cam for each unit for adjusting the load on each unit in accordance with the position of the cam associated with said unit, and means responsive to the total load of said units for changing the position of said cams.

50. In combination, a plurality of parallel connected electric power units, a separate cam associated with each unit and designed in accordance with the input-output curve of its associated unit, means associated with each unit and its associated cam for varying the loading of said unit in accordance with the angular position of the cam, and means responsive to the total load of all of said units for simultaneously and smoothly varying the angular positions of said cams in a manner to secure the most economical loading of said units taken as a whole.

51. In combination, a plurality of parallel connected turbo-alternators, individual load regulators responsive to the load on the respective alternators for varying the governor settings of their respective turbines, separate cams associated with each regulator and arranged to vary the settings of their associated regulators, and means responsive to the total load on all of said turbo-alternators for simultaneously varying the angular positions of said cams.

52. In combination, a plurality of parallel operated power translating units, separate means for varying the power translated by each of said units, connecting means for operating all of said separate means together so as to vary the load distribution among said units in accordance with a predetermined plan, and means responsive to the total power translated by said units for controlling said connecting means.

53. In combination, a plurality of parallel operated power translating units, separate adjustable means for each unit for varying the power translated by its associated unit, connecting means for simultaneously operating said adjustable means in a manner to secure substantially maximum overall efficiency of said units as a whole for any adjustment of said connecting means, and means responsive to the total power translated by said units for operating said connecting means.

54. In combination, a plurality of parallel connected electrical power units having dissimilar input-output curves, means for varying the total output of said units, and individual means for each unit included in said first mentioned means for causing dissimilar variations in the output of the individual units in accordance with their respective input-output curves.

55. An electrical system comprising a group of generating units, means responsive to changes in group load for controlling one of said units, and means for controlling the other of said units responsive to changes in the relations of the individual loads of all of said units.

56. Apparatus for controlling a plurality of prime mover operated electrical generating units comprising in combination operating mechanism for varying the power of each of the prime movers, watt-meters, one for each of said units and means controlled by each of said watt-meters for adjusting the operating mechanism of each of said units to maintain a substantially constant load on each unit, said means including means on each of said units for setting a predetermined combined load therefor.

S. LOGAN KERR.

CERTIFICATE OF CORRECTION.

Patent No. 2,050,338. August 11, 1936.

SAMUEL LOGAN KERR.

It is hereby certified that error appears in the printed specification of the above numbered patent requiring correction as follows: Page 2, first column, line 66, for the word "loading" read load; page 3, second column, line 6, for "local" read load; page 7, second column, line 25, for "radially" read radically; line 37, for "an" read and; page 9, first column, line 56, for "In" read If; page 11, second column, line 5, for "for" read more; page 14, first column, line 39, for "or" read so; page 15, first column, line 3, for "was" read when; and that the said Letters Patent should be read with these corrections therein that the same may conform to the record of the case in the Patent Office.

Signed and sealed this 24th day of August, A. D. 1937.

(Seal)

Leslie Frazer
Acting Commissioner of Patents.